United States Patent
Lutz et al.

(10) Patent No.: US 10,936,285 B2
(45) Date of Patent: Mar. 2, 2021

(54) OVERFLOW OR UNDERFLOW HANDLING FOR ANCHORED-DATA VALUE

(71) Applicant: Arm Limited, Cambridge (GB)

(72) Inventors: David Raymond Lutz, Austin, TX (US); Neil Burgess, County Of Cardiff (GB); Christopher Neal Hinds, Austin, TX (US)

(73) Assignee: Arm Limited, Cambridge (GB)

( * ) Notice: Subject to any disclaimer, the term of this patent is extended or adjusted under 35 U.S.C. 154(b) by 14 days.

(21) Appl. No.: 16/268,692

(22) Filed: Feb. 6, 2019

(65) Prior Publication Data

US 2020/0257499 A1    Aug. 13, 2020

(51) Int. Cl.
| | | |
|---|---|---|
| G06F 7/499 | (2006.01) | |
| G06F 7/48 | (2006.01) | |
| G06F 9/30 | (2018.01) | |

(52) U.S. Cl.
CPC .......... *G06F 7/4991* (2013.01); *G06F 7/4806* (2013.01); *G06F 7/49942* (2013.01); *G06F 9/3001* (2013.01)

(58) Field of Classification Search
None
See application file for complete search history.

(56) References Cited

U.S. PATENT DOCUMENTS

| | | |
|---|---|---|
| 6,633,895 B1 | 10/2003 | Bass et al. |
| 8,778,906 B2 | 7/2014 | Bondarev et al. |
| 8,984,042 B2 * | 3/2015 | Gschwind ............... G06F 7/483 |
| | | 708/204 |
| 9,665,347 B2 | 5/2017 | Lutz et al. |
| 9,690,543 B2 * | 6/2017 | Lutz ..................... G06F 9/30112 |
| 9,703,529 B2 | 7/2017 | Lutz et al. |
| 9,703,531 B2 | 7/2017 | Lutz et al. |
| 9,720,646 B2 | 8/2017 | Burgess et al. |
| 9,733,899 B2 | 8/2017 | Lutz et al. |

(Continued)

FOREIGN PATENT DOCUMENTS

| | | |
|---|---|---|
| GB | 2 454 201 | 5/2009 |
| WO | 2018/138469 | 8/2018 |

OTHER PUBLICATIONS

International Search Report and Written Opinion of the International Searching Authority for PCT/GB2020/050219 dated Apr. 2, 2020, 16 pages.

(Continued)

*Primary Examiner* — Michael D. Yaary
(74) *Attorney, Agent, or Firm* — Nixon & Vanderhye P.C.

(57) ABSTRACT

Processing circuitry may support processing of anchor-data values comprising one or more anchored-data elements which represent portions of bits of a two's complement number. The anchored-data processing may depend on anchor information indicating at least one property indicative of a numeric range representable by the result anchored-data element or the anchored-data value. When the operation causes an overflow or an underflow, usage information may be stored indicating a cause of the overflow or underflow and/or an indication of how to update the anchor information and/or number of elements in the anchored-data value to prevent the overflow or underflow. This can support dynamic range adjustment in software algorithms which involve anchored-data processing.

19 Claims, 16 Drawing Sheets

(56) References Cited

U.S. PATENT DOCUMENTS

| | | |
|---|---|---|
| 9,766,857 B2 | 9/2017 | Lutz et al. |
| 9,766,858 B2 | 9/2017 | Lutz et al. |
| 9,778,906 B2 | 10/2017 | Lutz et al. |
| 9,886,239 B2 | 2/2018 | Larri et al. |
| 9,928,031 B2 | 3/2018 | Burgess et al. |
| 2016/0124710 A1 | 5/2016 | Lutz et al. |
| 2018/0217815 A1 | 8/2018 | Hinds et al. |

OTHER PUBLICATIONS

N. Burgess et al, "High-Precision Anchored Accumulators for Reproducible Floating-Point Summation" *IEEE Transactions on Computers*, vol. 68, No. 7, Jul. 2019, pp. 967-978.

D.R. Lutz et al, "High-Precision Anchored Accumulators for Reproducible Floating-Point Summation" *2017 IEEE 24$^{th}$ Symposium on Computer Arithmetic*, Jul. 1, 2017, pp. 98-105.

U.S. Appl. No. 16/424,718, filed May 29, 2019, Inventor: Lutz et al.

Hida et al., "Algorithms for Quad-Double Precision Floating Point Arithmetic", Proceedings 15th IEEE Symposium on Computer Arithmetic. ARITH-15 2001, Jun. 11-13, 2001, pp. 155-162.

Bedichek, "Some Efficient Architecture Simulation Techniques", Department of Computer Science, FR-35, University of Washington, Winter 1990 USENIX Conference, 1990, 1-12 pages.

U.S. Appl. No. 16/268,665, filed Feb. 6, 2019, Inventor: Burgess et al.

International Search Report and Written Opinion of the International Searching Authority for PCT/GB2019/053363 dated Mar. 12, 2020, 13 pages.

Office Action dated Jul. 30, 2020 for U.S. Appl. No. 16/424,718, 12 pages.

\* cited by examiner

RHPA
(1) 4 x 64-bit portions
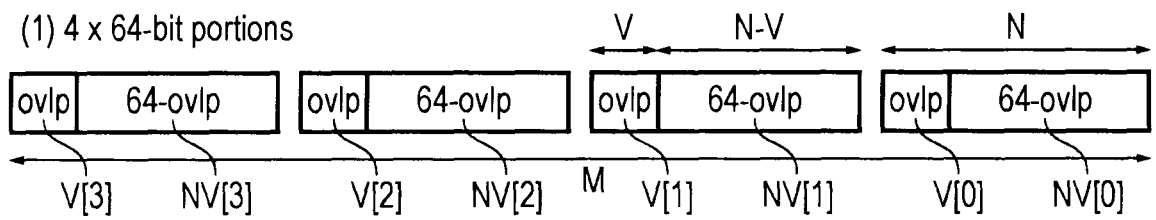
(2) (256-3*ovlp)-bit view, showing the weight of each bit
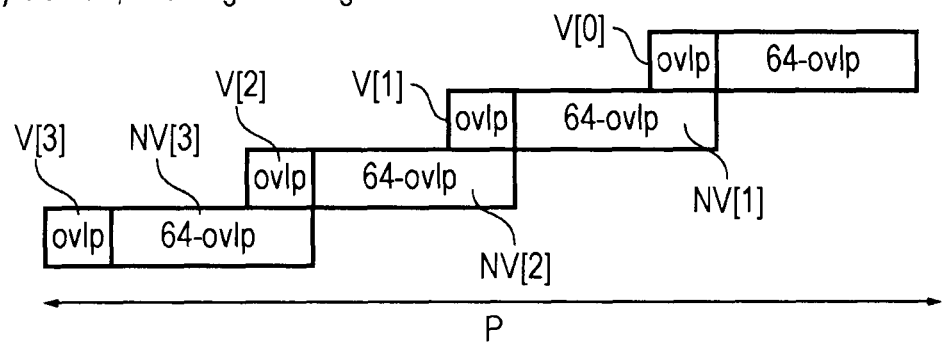
(3) (256-3*ovlp)-bit view, with overlap bits sign extended
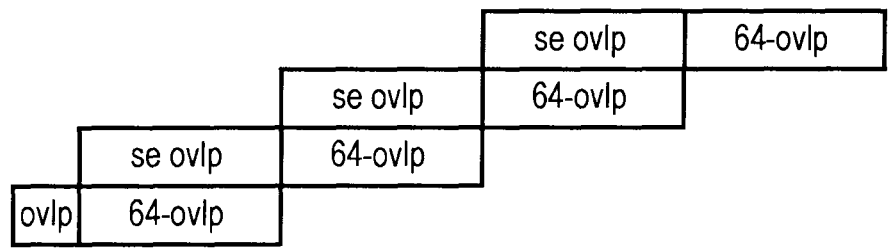
FIG. 4

| HPA[63:61] | Datatype |
|---|---|
| $0m_1m_0$ | HPA digit |
| 1s0 | ±Infinity |
| 101 | DNaN |
| 111 | Sat |

| | op2 | | | | |
|---|---|---|---|---|---|
| op1 | Num | Sat | +∞ | −∞ | DNaN |
| Num | Num, Sat | Sat | +∞ | −∞ | DNaN |
| Sat | Sat | Sat | +∞ | −∞ | DNaN |
| +∞ | +∞ | +∞ | +∞ | DNaN | DNaN |
| −∞ | −∞ | −∞ | DNaN | −∞ | DNaN |
| DNaN | DNaN | DNaN | DNaN | DNaN | DNaN |

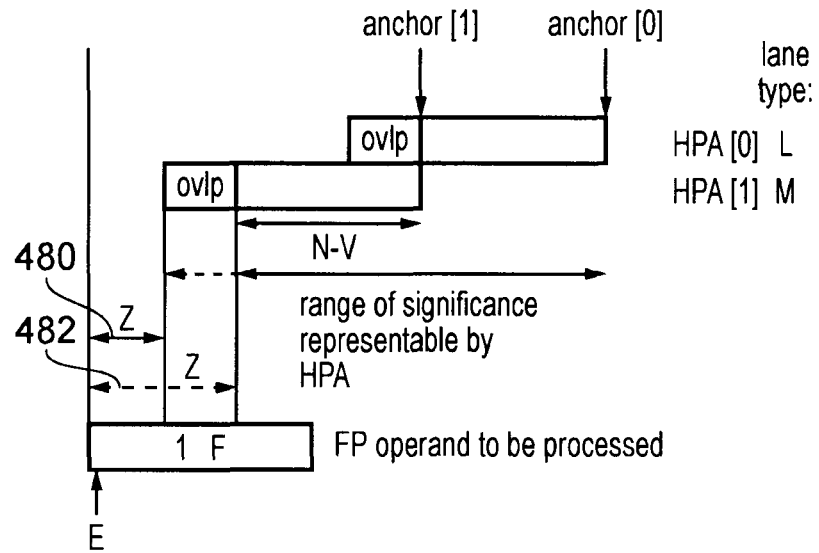
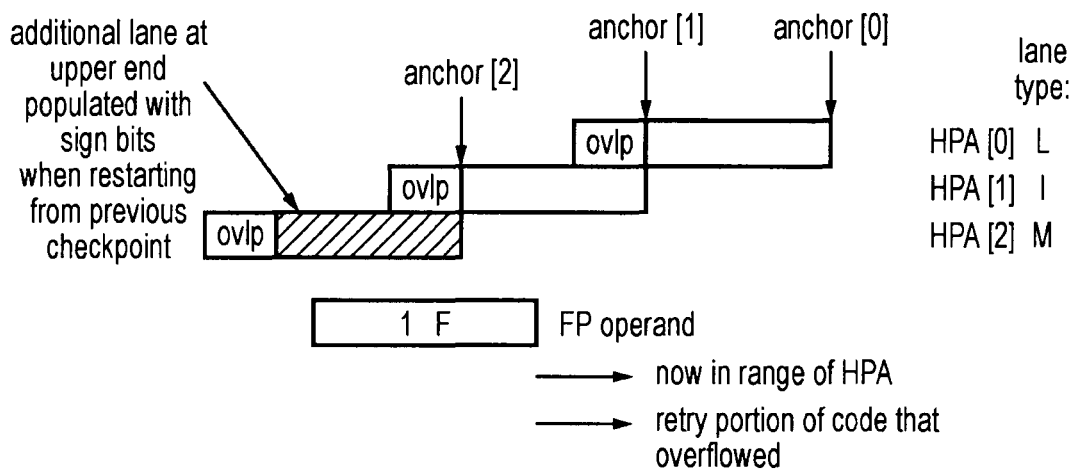
FIG. 15

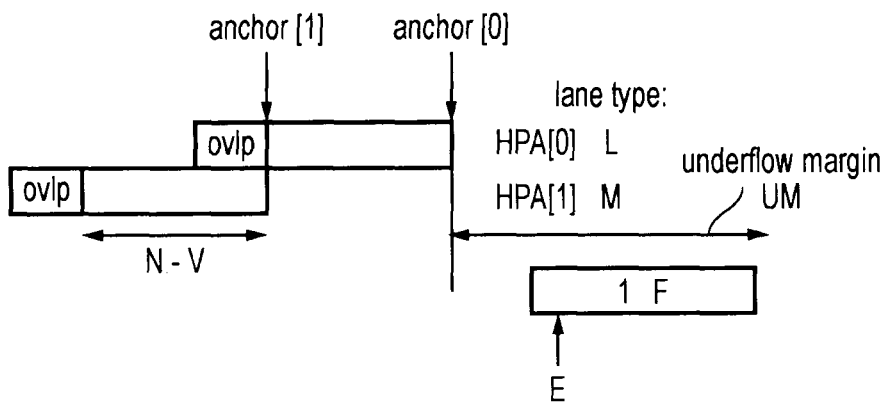
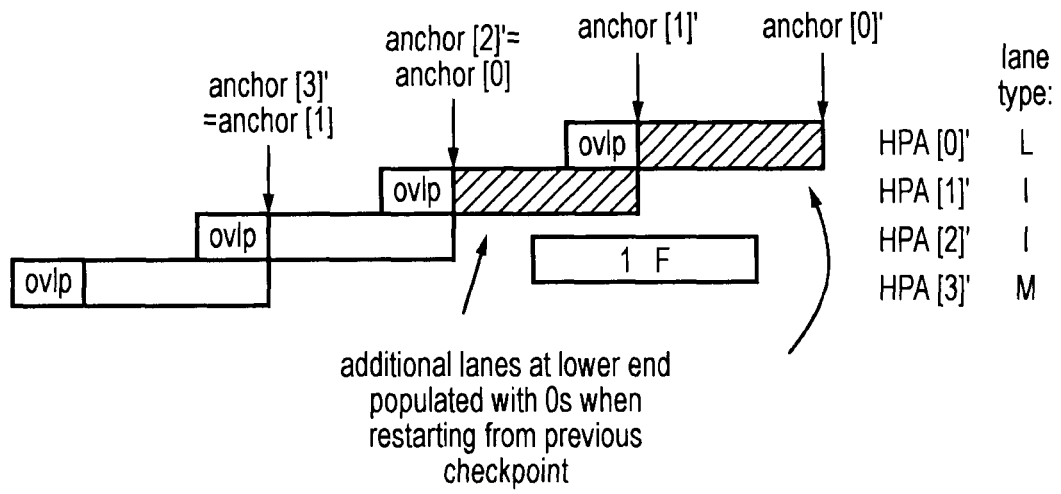
FIG. 16

OVERFLOW OR UNDERFLOW HANDLING FOR ANCHORED-DATA VALUE

BACKGROUND

Technical Field

The present technique relates to the field of data processing.

Background

It is common to use floating-point (FP) representation in data processing systems. A floating-point number includes a significand and an exponent indicating a significance of the bits of the significand. This allows numeric values over a large range to be represented using a finite number of bits. However, a problem with floating-point arithmetic is that calculations are generally non-associative, a fact that makes sums problematic. In particular programmers need to worry about obtaining different results, even when adding a small number of values.

To seek to address the associativity issue, a new datatype has been proposed, called a high-precision anchored (HPA) number. A high-precision anchored (HPA) number may comprise a pair (i, a) consisting of a long two's complement integer i (e.g. 200 bits), and a smaller anchor integer a that represents the weights of the bits of i, typically by specifying the significance of the smallest bit of i. Floating-point values can be converted into HPA form, and thereafter additions can be performed in an associative manner.

SUMMARY

At least some examples provide an apparatus comprising: processing circuitry to perform data processing; and an instruction decoder to control the processing circuitry to perform an anchored-data processing operation to generate a result anchored-data element of an anchored-data value comprising one or more anchored-data elements each representing a respective portion of bits of a two's complement number, said anchored-data value associated with anchor information indicative of at least one property indicative of a numeric range representable by the result anchored-data element or the anchored-data value; in which: in response to an anchored-data processing operation for which the anchor information indicates that the anchored-data processing operation would cause an overflow or underflow of the two's complement number to be represented by the anchored-data value, the instruction decoder is configured to control the processing circuitry to store, to a software-accessible storage location, usage information indicative of at least one of: a cause of the overflow or underflow, and an indication of how to change a format of the anchored-data value to prevent the overflow or underflow.

At least some examples provide a data processing method comprising: decoding one or more instructions; and in response to the decoded instructions, controlling processing circuitry to perform an anchored-data processing operation to generate a result anchored-data element of an anchored-data value comprising one or more anchored-data elements each representing a respective portion of bits of a two's complement number, said anchored-data value associated with anchor information indicative of at least one property indicative of a numeric range representable by the result anchored-data element or the anchored-data value; in which: in response to an anchored-data processing operation for which the anchor information indicates that the anchored-data processing operation would cause an overflow or underflow of the two's complement number to be represented by the anchored-data value, the processing circuitry stores, to a software-accessible storage location, usage information indicative of at least one of: a cause of the overflow or underflow, and an indication of how to change a format of the anchored-data value to prevent the overflow or underflow.

At least some examples provide a non-transitory storage medium storing a computer program for controlling a host data processing apparatus to provide an instruction execution environment for execution of instructions; the computer program comprising: instruction decoding program logic to decode program instructions of target code to control the host data processing apparatus to perform data processing; said instruction decoding program logic including anchored-data processing program logic to control the host data processing apparatus to perform an anchored-data processing operation to generate a result anchored-data element of an anchored-data value comprising one or more anchored-data elements each representing a respective portion of bits of a two's complement number, said anchored-data value associated with anchor information indicative of at least one property indicative of a numeric range representable by the result anchored-data element or the anchored-data value; in which: in response to an anchored-data processing operation for which the anchor information indicates that the anchored-data processing operation would cause an overflow or underflow of the two's complement number to be represented by the anchored-data value, the instruction decoding program logic is configured to control the host computer to store, to a software-accessible storage location, usage information indicative of at least one of: a cause of the overflow or underflow, and an indication of how to change a format of the anchored-data value to prevent the overflow or underflow.

At least some examples provide a data processing method comprising: capturing a checkpoint of architectural state; performing a portion of a sequence of data processing operations based on the architectural state captured in the checkpoint, the portion including at least one anchored-data processing operation to generate a result anchored-data element of an anchored-data value comprising one or more anchored-data elements each representing a respective portion of bits of a two's complement number, said anchored-data value associated with anchor information indicative of at least one property indicative of a numeric range representable by the result anchored-data element or the anchored-data value; performing overflow or underflow detection to detect whether the at least one anchored-data processing operation causes an overflow or underflow of the anchored-data value; and when the overflow or underflow is detected, restoring the checkpoint of architectural state, changing a format of the anchored-data value, and retrying said portion of the sequence of data processing operations based on the changed format and the restored checkpoint of architectural state.

At least some examples provide a non-transitory storage medium storing a computer program for controlling a data processing apparatus to perform the method involving capturing a check point of architectural state as described above.

Further aspects, features and advantages of the present technique will be apparent from the following description of examples, which is to be read in conjunction with the accompanying drawings.

BRIEF DESCRIPTION OF THE DRAWINGS

FIG. 4 shows an example of a Redundant HPA value, which represents a numeric value using a redundant representation including a number of N-bit portions with overlapping significance;

FIG. 15 shows an example of providing at least o additional element at a most significant end of an anchored-data value in response to a detected overflow;

FIG. 16 shows an example of providing at least one additional element at a least significant end of an anchored-data value in response to a detected underflow.

DESCRIPTION OF EXAMPLES

Figure 1:
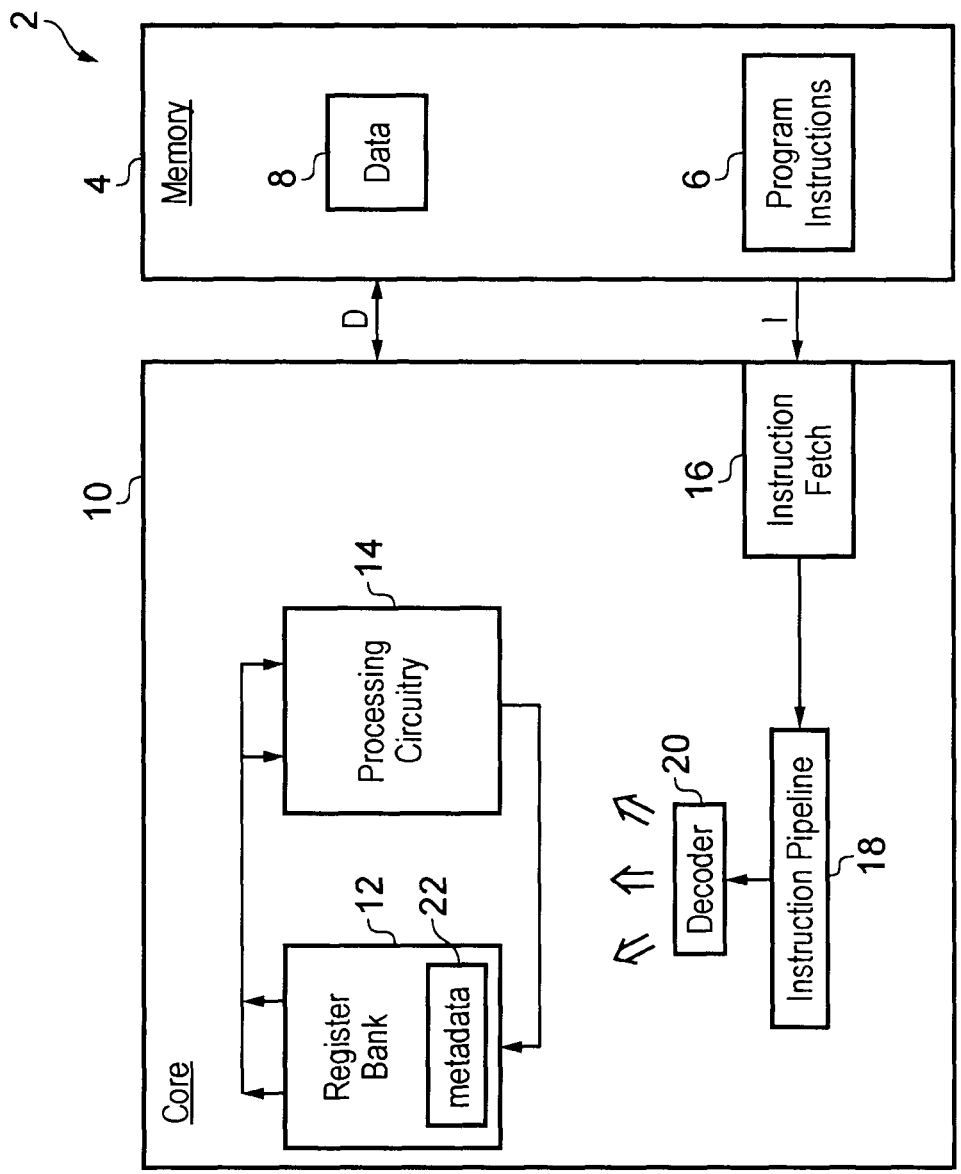
FIG. 1 schematically illustrates a data processing apparatus.

As mentioned earlier, a problem with floating-point arithmetic is that calculations are generally non-associative, a fact that makes sums problematic. For example, when adding several floating-point values, each time another value is added to the result of the previous addition, the result is rounded and normalised, which means that the overall result is different depending on the order in which the values are added. This makes it difficult to parallelize floating-point arithmetic, because sums are not reproducible unless completed in the exact same order. To generate a reproducible result, a series of additions or subtractions typically have to be performed sequentially, which can make floating-point arithmetic relatively slow.

Programmers therefore use higher accuracy than they need, in the hope of avoiding such different results. Programmers, therefore, cannot easily parallelize code because sums are not reproducible unless computed in the exact same order.

The problem is especially acute for high-performance computing (HPC), where programs may need to add millions of values. Programmers would like to parallelize these problems, but then the lack of reproducibility makes debugging difficult. Every different machine configuration will produce different answers even if the reprogramming for those machines is done perfectly.

As mentioned above, to seek to address the associativity issue, a new datatype has been proposed, called a high-precision anchored (HPA) number. An HPA number may comprise a pair (i, a) consisting of a long two's complement integer i (e.g. 200 bits), and a smaller anchor integer a that represents the weights of the bits of i, typically by specifying the significance of the smallest bit of i. The pair is somewhat analogous to an FP number's significand and exponent values, but differs in that the long integer i is not normalized and is usually much larger than an FP significand, and in that the anchor value a is fixed for all operands in an HPA operation. Adding FP numbers may cause the exponent to change, but adding HPA numbers does not change the anchor.

As a trivial example, consider an HPA representation consisting of a 10-bit i and an anchor value a=−4. Some values in this format are given in Table 1.

TABLE 1

| example HPA numbers (i, −4) | |
|---|---|
| i (binary) | value (decimal) |
| 00000_00001 | 0.0625 |
| 00000_01000 | 0.5 |
| 00000_11000 | 1.5 |
| 00001_00000 | 2.0 |
| 00100_11000 | 9.5 |
| 11111_01000 | −1.5 |

When adding two of these numbers, say 0.5 and 1.5, the anchor (−4) does not change, and the sum is conveniently given by adding just the i values. Since HPA sums are just two's complement addition, when the range is sufficient, HPA sums are associative, exact and repeatable.

FP numbers have a large range. Double precision numbers (FP64) can be smaller than $2^{-1000}$ and larger than $2^{1000}$, but most accumulations do not span this entire range. Indeed, it is hard to imagine the kind of problem that would meaningfully accumulate values over all of that range, and even for HPC most accumulations happen over a limited range. It is expected that 200 bits or so is more than enough for almost all applications requiring wider than double-precision arithmetic. Suppose that a programmer determines that all of the data for a particular sum has magnitude less than $2^{100}$, and that bits with magnitude below $2^{-50}$ won't affect the sum in any meaningful way. If the data is added using the HPA format (i, −50) with 200-bit i, then the accumulation is associative and at least $2^{49}$ of these numbers can be added in any order without worrying about overflow.

Most modern architectures have SIMD (Single Instruction Multiple Data) units which could be used to represent long integers. With a bit of extra logic to facilitate carries between 64-bit lanes, a 256-bit SIMD unit could be used to add 256-bit integers. Alternatively, carries between lanes could be avoided for most additions by using a redundant representation discussed in more detail later. One approach for representing an HPA (anchored-data) value (or long integer) in a SIMD register could be to allocate a number of HPA (anchored-data) elements of the HPA value to the respective vector lanes within a single SIMD register. Alternatively, as discussed below another approach can be that the respective anchored-data elements of an HPA value could be allocated to corresponding vector lanes within a number of different SIMD registers, so that each portion of the overall anchored-data value is in a corresponding position of a different vector register, and a single vector register may hold a number of anchored-data elements each of which forms part of a different anchored-data value (HPA value).

In the techniques below, an apparatus has processing circuitry to perform data processing and an instruction decoder to decode instructions for controlling the data processing performed by the processing circuitry. The instruction decoder may support instructions for controlling the processing circuitry to perform an anchored-data processing operation to generate a result anchored-data element of an anchored-data value comprising one or more anchored-data elements each representing a respective portion of bits of a two's complement number. The anchored-data processing operation depends on anchor information which may indicate at least one property indicative of a numeric range representable by the result anchored-data elements or the anchored-data value. The use of the anchor information enables the architecture to support a wide range of numeric values in the anchored-data format, while being able to limit the number of bits used in calculations depending on the expected range of values anticipated for a given application by the programmer or compiler. However, there is a possibility that the programmer or compiler may not set the anchor information appropriately, and sometimes inputs could be provided to a series of operations which are not able to be represented in the anchor-data format within the allowed numeric range defined by the anchor information. Hence, sometimes a anchored-data processing operation could cause an underflow or an overflow of the two's complement number to be represented by the anchored-data value, where the correct value of the processing result is larger or smaller than the numeric range which can be represented by the anchored-data value. One approach for handling such overflows or underflows could be simply to signal an exception which may then trigger software to take some response action. However, this may make it difficult for the software to determine how to react.

In the techniques discussed below, the processing circuitry and instruction decoder may support making available to software usage information which indicates at least one of: a cause of the overflow or underflow, and an indication of how to change a format of the anchored-data value to prevent the overflow or underflow. The indication of change of format could for example be an indication of a number of additional anchored-data elements to provide in the anchored-data format, an indication of the total number of additional anchored-data elements, and/or an indication of updated anchor information.

Hence, in the case of an overflow or underflow, the hardware returns information on either a reason for why the overflow or underflow may have happened, or an indication of how to change the format of the anchored-data value to prevent the overflow or underflow, or both, to assist the software in determining how to proceed. This can support software algorithms which may dynamically adjust the format of the anchored-data value (e.g. by changing the anchor information and/or number of elements) as discussed below. This can make it much easier for software developers to design software to use the anchored-data processing. The storage of the usage information to a software-accessible storage location may be performed automatically in hardware as a response to the anchored-data processing operation which triggered the overflow or underflow, rather than needing any dedicated state saving instructions to control the saving of the usage information.

The anchor information could indicate one or more different properties of either the anchored-data element to be generated in a given anchored-data processing operation or the anchored-data value as a whole. For example the at least one property could comprise at least one of:

a significance of the portion of bits to be represented by the result anchored-data element;

a width of the portion of bits of the two's complement number to be represented by the result anchored-data element;

a relative position of the result anchored-data element relative to one or more other anchored-data elements of the anchored-data value; and a total number of anchored-data elements provided within the anchored-data value. It is not essential for the anchor information to indicate all of the properties described above. Here the term significance refers to the particular power of two represented by a given bit position. For example, a bit of a two's complement number which the bit value that represents $2^4$ is considered to have greater significance than the bit of the two's complement number which represents $2^3$. That is, the most significant bit of a two's complement number has the highest significance and the least significant bit has the lowest significance.

As mentioned above, when implementing anchored-data processing as a vector operation, it is possible either to spread the different anchored-data elements of the same anchored-data value across multiple lanes within a single vector register, or to stripe the respective data elements of the same anchored-data value across the corresponding lanes of multiple vector registers. In the first case, the anchor metadata could specify the total number of anchored-data elements in the anchored-data value, or alternatively a separate variable could define the number of anchored-data elements. In the second case, the anchor metadata itself need not indicate the total number of anchored-data elements, as a given anchored-data processing instruction may only see one element of the anchored-data value at a time and so the anchor metadata provided as a source operand for an anchored-data processing operation need not define the total number of anchored-data elements. The total number of anchored-data elements could in this case be specified separately using a different variable maintained by the program which controls the anchored-data processing. This variable could be used to control how many anchored-data processing instructions are executed to process the respective anchored-data elements of a given anchored-data value each acting on an element in a different register.

The usage information could be returned for any anchored-data processing operation which could cause an overflow or underflow of an anchored-data value. However, it can be particular useful where the anchored-data processing operation comprises a conversion operation which is dependent on conversion of a floating point value to the result anchored-data element representing a portion of bits of the two's complement number corresponding to the floating-point value. Often a cause of an overflow or underflow of the anchored-data value may be that a floating-point value provided as an input to a sequence of operations to be performed using anchored-data processing was outside the numeric range defined by the anchor information. Hence, on such a float-to-anchored conversion operation, if the precise representation of the numeric value of the floating-point value in anchored-data format would require at least one more significant bit or less significant bit than can be represented in the allowed numeric range, then an overflow or underflow may be signalled. The float-to-conversion operation could be a standalone conversion operation which converts the floating-point value to an anchored-data element but does carry out any further processing of the anchored-data elements, or a convert-and-add operation which converts the floating point value and also adds the anchored-data element resulting from the conversion to a second anchored-data element.

For such a float-to-anchored conversion operation, the usage information could in some examples comprise information derived from an exponent of the floating-point value which cause the overflow or underflow. This can be useful to allow software to determine from the usage information what changes may be needed to the total number of elements in the anchored-data value and/or the anchor information, to be able to accommodate the same floating-point value if the same sequence of operations is retried later. The information derived from the exponent could be represented in different ways. In some cases the usage information could simply comprise the exponent itself. Alternatively the usage information could comprise a flag indicating whether the exponent was in the allowed numeric range or not. Sometimes processing of a floating-point value which is within the allowed numeric range could nevertheless lead to an overflow or underflow, if adding several anchored-data values which each correspond to floating-point values near the maximum value of the allowed range leads to a result exceeding the allowed range. Hence an indication of whether the exponent of a converted floating-point value was in the range or not can still be useful to allow software to determine whether a single additional anchored-data element for the anchored-data value may be enough to deal with the overflow, or whether more elements may be required. Another example (of usage information depending on the exponent of the floating-point value being converted) may be an indication of how far the exponent is outside the expected range, or an indication of a number of additional elements needed in the anchored-data value in order to accommodate a numeric value equivalent to the floating-point value within the anchored-data value having the allowed numeric range defined by the anchor information. All of these examples can enable software to decide how to update the anchored-data value format to accommodate the floating-point value which caused the overflow or underflow.

Different implementations may choose different locations as a software-accessible storage location to which the usage information is stored. It would be possible for the software-accessible storage location to be a location in memory.

However, in other examples the software-accessible storage location comprises at least one of:

a destination register also used to store the result anchored-data element; and at least one of a general purpose register and a dedicated register, separate from a register to which the result anchored-data element is stored.

It can be useful for the software-accessible storage location to comprise the same destination register which is also used to store the result anchored-data element generated in the anchored-data processing operation which caused the overflow or underflow. This means that no additional store operations to memory are required and also only a single register write may be needed for the anchored-data processing instruction, which helps to reduce the complexity of the micro-architecture. There may be relatively few instructions in an instruction set architecture that need to update two or more destination registers, and so many micro-architectural implementations may only provide one register write port. Therefore, avoiding a need to provide a second register write port to support return of the usage information can help to reduce circuit area and power consumption. Alternatively, even if the apparatus has more than one register write port, when processing an anchored-data processing operation, the second write port could be used to execute a different register write in response to a different instruction, rather than being used for the same instruction as the first register write port. Hence, storing the usage information into the same register as the result can improve efficiency of the micro-architecture implementation.

The usage information could be written to some of the bits of the destination register which would normally store part of the two's complement value of the result if no overflow or underflow had occurred. Although one might expect that this would be undesirable as the result itself can not be fully represented, in practice in cases where an overflow or underflow has occurred then the operation will likely be repeated later with a different value of the anchor information, and so at this point the actual numeric value represented by the anchored-data elements which overflowed or underflowed may no longer be important. Hence by reusing bits which would normally provide parts of the data value itself to signal the usage information this can avoid needing additional storage. Hence, the usage information may be specified within part of the result anchored-data element itself.

In a subsequent anchored-data processing operation, if the input anchored-data element to a given operation specifies usage information within part of the anchored-data element, then the processing circuitry may generate a result anchored-data element also specifying the usage information. Hence the usage information may be sticky in the sense that, once set, then it persists through the results of a series of processing operations, so that at the end of that series the software will be able to examine the final result to determine whether any operation in that series of operations generated an overflow or underflow, and then learn from the usage information a possible cause and/or an indication of how to change the format of the anchored-data value to prevent the overflow or underflow. In implementations where the usage information includes some information derived from the exponent of a floating-point value, which indicates how far outside the allowed range the floating point value would be (e.g. the exponent itself, or a difference between the exponent and an effective exponent equivalent to the boundary of the allowed numeric range), then if an input anchored-data element specifies the usage information and then a further floating point value which lies even further outside the numeric range than already indicated by the usage information in the input-anchored-data element is encountered, then the result anchored-data element may be generated with updated usage information which is updated based on the exponent of the floating-point value for the latest anchored-data processing operation. Hence, through a series of anchored-data processing operations, the usage information may gradually be updated to track the floating-point value which lies furthest outside the allowed range defined by the anchor information and/or the number of elements of the anchored-data value.

In other examples, the software-accessible storage location could comprise at least one of a general purpose register and a dedicated register which is separate from a register to which a result anchored-data element is stored. Although this may require a second register, an advantage may be that this allows the numeric value of the result anchored-data element to be preserved alongside the usage information. Again, where the usage information indicated how far outside the expected range the inputs to an operation were, then the usage information in a separate register could again be updated in successive operations to track the greatest margin outside the range seen in that series of operations.

In some examples the anchor information associated with a given anchored-data element may comprises element type information indicating whether that element is the most significant, intermediate or least significant anchored-data element of the anchored-data value. This can be useful for supporting striping of anchored-data values across multiple registers and/or for supporting anchored-data values of a different length to the length of an individual vector register. The instruction decoder may control the processing circuitry to use the element type information within the anchor information to decide whether, when an overflow or underflow is detected in a given anchored-data processing operation, it is necessary to generate the usage information and store it to the software-accessible storage location. For example, if the current operation is generating an intermediate or least significant anchored-data element of a given anchored-data value, then if there is an overflow this may indicate that there has been a lane overflow within the anchored-data value, due to not performing overlap propagation often enough as discussed below, rather than being a signal that the anchor information has been said inappropriately. In some cases, a more serious response action may be required for handling lane overflow, such as triggering an exception, rather than merely signalling usage information. Hence, in some cases the usage information generated on an overflow may be restricted to cases when the anchored-data processing operation is one which is to generate the most significant anchored-data element of the anchored-data value.

On the other hand, for an operation generating the most significant anchored-data element of a given anchored-data value, if there is an underflow than again this may not need reporting using usage information, since there may be a lower element to be calculated by a different instruction which may accommodate the less significant bits of the result. Hence, reporting of underflows through the usage information may be restricted to anchored-data processing operations for which the anchor information indicates that the result anchored-data element is the least significant anchored-data element of the anchored-data value.

It is not essential to report both overflow and underflow using usage information. In some systems, underflows may not be considered important to track, as they may simply lead to a loss of precision, whereas overflows may be considered more critical as this may lead to the wrong magnitude of value being represented. Hence, some implementation could set the usage information only in response to overflows and not in response to underflows.

As discussed further below, in some examples the hardware architecture may automatically return the usage information in the software-accessible location, but then the software executing on the hardware may then use the usage information to determine how to respond to any overflow or underflow, e.g. by changing the format of the anchored-data value by providing additional elements and/or changing the anchor information.

However, in other implementations, some hardware could be provided for automatically using the usage information to adapt the format of the anchored-data value, so that the programmer/compiler does not need to include instructions for checking the usage information. Hence, in some examples the processing circuitry may be operable to perform at least one of:

when the overflow is detected within a portion of a sequence of processing operations including the anchored-data processing operation, extending the anchored-data value by at least one additional anchored-data element at a most significant end of the anchored-data value;

when the underflow is detected within said portion of a sequence of processing operations, extending the anchored-data value by at least one additional anchored-data element at a least significant end of the anchored-data value; and when both the overflow and the underflow are detected within said portion of a sequence of processing operations, extending the anchored-data value by at least one additional anchored-data element at a most significant end of the anchored-data value and by at least one additional anchored-data element at a least significant end of the anchored-data value.

In another example, a method of data processing may include a sequence of data processing operations which involve at least one anchored-data processing operation. In this method, prior to performing a portion of the sequence of data processing operations, a checkpoint of architectural state could be captured. This checkpoint need not be a complete record of the current architectural state, but may include at least the architectural state that may be overwritten when performing the portion of the sequence of data processing operations. That portion is then performed, including at least one anchored-data processing operation which generates a result anchored-data element based on anchor information as discussed above. Overflow or underflow detection is performed to detect whether the at least one anchored-data processing operation causes an overflow or underflow of the anchored-data value. When the overflow or underflow is detected, the previously captured checkpoint of architectural state can be restored, a format of the anchored-data value is changed, and the same portion of the sequence of data processing operations can then be retried based on the changed format and the restored checkpoint of architectural state.

This method enables a software routine to automatically detect whether any overflow or underflow has occurred and if so to adjust the format of the anchored-data value (e.g. by changing the number of elements and/or the anchor information) and retry the operations, so that the program can itself react to potentially inappropriate setting of the anchor information by a programmer or compiler, and can learn from the operations performed. This greatly reduces the burden on the programmer in programming software which is to use anchored-data processing. For example, a library may be provided with a routine to perform such a method, which can be called by a given program to process a certain number of floating-point values in the anchored-data format, including a number of conversions and additions. By capturing checkpoints of architectural state at intervals through the sequence of processing operations to be performed, and adding additional lanes or updating the anchor information automatically if an overflow or underflow is detected so that the previous portion can be retried if necessary, this enables dynamic adjustment of the anchor and hence forward progress can be made without needing the programmer to anticipate the range of magnitudes of the floating-point inputs provided.

On the other hand, if in performing the overflow or underflow detection it is detected that the at least one anchored-data processing operation did not cause an overflow or underflow, then the method may comprise capturing a further checkpoint of architectural state resulting from the portion of data processing operations, before proceeding to the next portion of the sequence of data processing operations. The next portion would then be processed with the same anchored-data format that was used for the previous portion, without updating the anchor information or number of elements. Alternatively, if the just completed portion of the sequence was the final portion then the sequence can be halted and results in anchored-data format could be converted back to a floating-point format or other numeric format if desired.

It can be particularly useful for the change of format made when overflow or underflow is detected to comprise an extension of the number of elements in the anchored-data number format, to provide at least one additional anchored-data element. This allows the portion of the code sequence to be retried with a format which enables a greater range of significance to be represented, so that values lying outside the range previously represented can now be accommodated.

When the overflow is detected, the change of format may comprise extending the anchored-data value by at least one additional anchored-data element at a most significant end of the anchored-data value. When at least one additional element is provided at the most significant end of the anchored-data value, then when the portion of the sequence is retried with the updated number of elements, the newly added element may initially be populated with a sign-extension of the existing elements of the anchored-data value (as represented by the captured checkpoint of architectural state).

When the underflow is detected, the change of format may comprise extending the anchored-data value by at least one additional anchored-data element at a least significant end of the anchored-data value. When at least one additional element is provided at the least significant end of the anchored-data value, then when the portion of the sequence is retried, the newly added element may initially be populated with zeroes.

Also, it is possible that within the most recently processed portion of the code sequence, both overflow and underflow could have occurred (e.g. the processing may be based on one floating-point input which lies below the range represented by the anchored-data value and another floating-point input which has a significance greater than the range represented by the anchored-data value). When both overflow and underflow are detected within said portion of sequence of data processing operations, the change of format may comprise extending the anchored-data value by at least one additional anchored-data element at a most significant end of the anchored-data value and by at least one additional anchored-data element at a least significant end of the anchored-data value.

The overflow or underflow detection could be performed at any arbitrary time during the sequence of operations. In some cases the overflow or underflow detection could be performed in response to each anchored-data processing operation.

However, it may be more efficient to check for overflow or underflow at intervals through the sequence rather than in response to every anchored-data processing operation. Hence the overflow or underflow detection can be performed at intervals of a given number of anchored-data processing operations.

In some examples, an anchored-data element may be represented using a redundant representation where a number of overlap bits may be allocated within the element to accommodate carries resulting from additions performed within a less significant portion of the data element. This can help to reduce the chance that a series of anchored-data processing operations causes an overflow out of the anchored-data element. The representation may be redundant in the sense that there may be a number of different patterns of bits of an anchored-data value formed of multiple anchored-data elements which could all represent the same numeric value of a two's complement number, with different combinations of overlap bits and non-overlap bits. More information is provided on this below.

Hence, in general an anchored-data element may comprise an N-bit value which includes V overlap bits and W non-overlap bits. The particular number of overlap bits and non-overlap bits could be fixed or could be variable, for example by specifying information in the anchor metadata discussed above.

In a float-to-anchored conversion operation for converting a floating-point value to the anchored-data element, when the floating-point value represents a number other than a special number (such as a NaN or infinity) and the number is within an allowed numeric range for the anchored-data value for which that anchored-data element forms part, the processing circuitry may set the W non-overlap bits of the anchored-data element to represent a portion of bits of the two's complement number which corresponds to the floating-point value. In contrast, the V overlap bits of the anchored-data element may be set to a sign-extension of the W non-overlap bits. Hence, initially the overlap bits may be set to a sign-extension, e.g. all zeros or all ones. However, when the anchored-data element generated by the float-to-anchored conversion operation is then processed in a series of additions then this can result in a number of carries into the overlap bits. To work out the two's complement number represented by the overall anchored-data value in a non-redundant representation, an overlap propagation operation may be provided to propagate the carries represented by the overlap bits of one anchored-data element into the non-overlap bits of the next highest anchored-data element of the anchor-data value.

Hence, in some examples the overflow or underflow detection (and the restoration of the checkpoint and change of format of the anchored-data value if an overflow or underflow is detected) could be performed at the time of performing the overlap propagation operation for propagating carries represented by the V overlap bits of a first anchored-data element in to the W non-overlap bits of a second anchored-data element. It can be convenient to perform the checking of whether overflow or underflow has occurred at the time of overlap propagation because this means the overflow or underflow detection is not performed too often, but also means that the overhead of carrying out the overlap propagation operation itself can be avoided in cases where an overflow or underflow has occurred so that it is needed to repeat the previous portion of the sequence operations. Hence, in practice the overflow or underflow detection may be performed prior to the overlap propagation operation to enable the overlap propagation operation to be suppressed in cases where an overflow or underflow occurs.

In some examples, the change of format of the anchored-data value may depend on usage information as discussed above, which is stored to a software-accessible storage location in response to an operation which causes the overflow or underflow. Hence, the return of the usage information at an architectural level (without the need for dedicated instructions specifying the usage information) can assist the dynamic anchor information updating method as discussed above.

Nevertheless, the dynamic updating of the format of the anchored-data value could also be performed without using usage information. For example, another approach could be that if an overflow is detected then the change of format could simply follow some default action, such as extending the width of the anchored-data value by one data element, and in the case of an underflow, also reducing the significance of the lowest bit of each anchored-data element of the anchored-data value (in addition to increasing the number of elements). The usage information can enable the correct anchored-data format for a given set of operands to be arrived at faster, but nevertheless it would be possible in architectures which do not return usage information for a software routine to incrementally adjust the total number of elements and/or the anchor information each time an overflow or underflow occurs until the overflow or underflow no longer occurs.

Although it is useful to provide for a dynamic update to the anchored-data format and retry the portion of the code sequence that previously caused the overflow or underflow, in some cases such a retry may not be desirable. Hence, it is not essential to perform the retry on every occasion when an overflow or underflow is detected.

In some examples, when the overflow or underflow is detected, the method may comprise: determining whether the usage information satisfies at least one retry condition; when the usage information satisfies the at least one retry condition, changing the format of the anchored-data value based on the usage information and retrying the portion of the sequence of data processing operations based on the changed format (as in the examples described above), and when the usage information fails to satisfy the at least one retry condition, terminating the sequence of data processing operations or continuing the sequence of data processing operations without retrying said at least one portion.

In the case when the usage information fails to satisfy said at least one retry condition and so the processing is terminated or continued without retry, the method may include returning the usage information or other information concerning the overflow or underflow, to help assess how to avoid the overflow/underflow in future.

For example, the at least one retry condition could comprise at least one of:
 a margin of overflow or underflow being less than a predetermined amount;
 a number of additional anchored-data elements required to prevent the overflow or underflow being less than or equal to a predetermined number; and
 a number of previous attempts to retry said portion of the sequence of data processing operations being less than a predetermined threshold.

For example, if the margin of overflow/underflow is such that a large number of additional anchored-data elements is required to prevent the overflow/underflow, it may be inefficient to simply extend the number of elements by that large number, e.g. this may be an indication that the anchor significance has been set inappropriately, and there could be a risk that simply extending the number of elements could lead to a number of wasted processing operations where several elements of the anchored-data value end up being filled entirely with zeroes or sign bits because the magnitude of the actual input operands being processed lies far outside the range defined by the original anchor information. In this case, it may be more efficient to terminate the sequence, and return information on the overflow that occurred, so that a more detailed examination of any returned information can be carried out to determine how the anchor information and/or number of lanes should be set in future. Alternatively, rather than terminating, it may be preferred to allow the sequence of processing operations to continue without termination (and without retrying the previously performed portion), to gather more information on any further overflows/underflows which may occur in the remaining part of the sequence.

Hence, it is not essential for every instance of detecting overflow/underflow to be dealt with by a dynamic update to the number of lanes and/or the anchor information—the method may include a determination of whether certain condition(s) for a dynamic update are satisfied, and then perform the dynamic update and retry when at least one retry condition is satisfied.

On completion or termination of the overall sequence of the data processing operations, the method may include storing to a software-accessible storage location, information indicating at least one of:
 a condition which required retry of a portion of the sequence of data processing operations;
 a final number of anchor-data elements included in the anchored-data value when the sequence of data processing operations is completed; and
 final anchor information resulting from any updates made during performance of the sequence of data processing operations.

This is useful to give some information on why a portion of the sequence may have needed retrying, which can help software developers or compilers to determine how better to set the anchor information for the given program in future, which can then improve performance as it is less likely that as many or retries will be needed for a particular part of sequence of operations to be performed.

Particular examples will now be described with reference to the Figures.

A high-precision anchor (HPA) format is discussed below. More information about the HPA format can be found in the U.S. patent applications Ser. Nos. 62/074,149, 14/582,974, 14/582,875, 14/582,812, 14/582,836, 14/582,978, 14/606,510, and 14/582,968, the contents of which are entirely incorporated herein by reference.

Floating-Point Numbers

Floating-point (FP) is a useful way of approximating real numbers using a small number of bits. The IEEE 754-2008 FP standard proposes multiple different formats for FP numbers, some of which are binary 64 (also known as double precision, or DP), binary 32 (also known as single precision, or SP), and binary 16 (also known as half precision, or HP). The numbers 64, 32, and 16 refer to the number of bits required for each format.

Representation

FP numbers are quite similar to the "scientific notation" taught in science classes, where instead of negative two million we'd write $-2.0 \times 10^8$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers consist of a sign bit, some number of biased exponent bits, and some number of fraction bits. In particular, the DP, SP and HP formats consist of the following bits:

TABLE 2

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign} \times 1.\text{fraction} \times 2^e$$

where e is the true exponent computed from the biased exponent. The term 1·fraction is called the significand, and the 1 is not stored as part of the FP number, but is instead inferred from the exponent. All exponents except zero and the maximum exponent indicate a significand of the form 1·fraction. The exponent zero indicates a significand of the form 0·fraction, and a true exponent that is equal to 1-bias for the given format. Such a number is called subnormal (historically these numbers were referred to as denormal, but modern usage prefers the term subnormal).

Numbers With both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

TABLE 3

| Sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | −infinity |
| 0 | 11111 | 00_1111_0011 | | NaN |

A large part of the complexity of FP implementation is due to subnormals, therefore they are often handled by microcode or software. Some processors handle subnormals in hardware, speeding up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001
−1=1001

In two's complement representation, an (n+1)-bit binary integer represents numeric value $i-S*2^n$, where i is an n-bit integer i is represented by the low order n bits of the n+1-bit value, and S is the bit value (0 or 1) of the most significant bit of the (n+1)-bit value. Hence, unlike for sign-magnitude numbers, where the sign bit modifies the sign of all other bits of the value, for a two's complement value the most significant bit is weighted negatively and all other bits are weighted positively. Hence, a 4-bit two's complement integer would represent plus and minus one as:

+1=0001
−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are:

TABLE 4

| mode | | definition |
|---|---|---|
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:
L—(least) the least significant bit of the truncated value
G—(guard) the next most significant bit (i.e. the first bit not included in the truncation)
S—(sticky) the logical OR of all remaining bits that are not part of the truncation Given these three values and the truncated value, we can always compute the correctly rounded value according to the following table:

TABLE 5

| Mode | change to the truncated value |
|---|---|
| RNE | increment if (L&G) | (G&S) |
| RNA | increment if G |
| RZ | none |
| RP | increment if positive & (G|S) |
| RM | increment if negative & (G|S) |
| RX | set L if G|S |

For example, consider multiplying two 4-bit significands, and then rounding to a 4-bit significand.
sig1=1011 (decimal 11)
sig2=0111 (decimal 7)
multiplying yields
sig1×sig2=1001 101 (decimal 77)
  L Gss The least significant bit of the truncated 4-bit result is labelled L, the next bit G, and S is the logical OR of the remaining bits labelled s (i.e. s=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

Rounding Integer and Fixed-Point Numbers

If we convert an FP number to integer or fixed-point we also round. The concept is basically the same as FP rounding. An FP number that happens to be an integer always rounds to that integer. All other FP numbers lie between two consecutive integers, and rounding dictates which integer is returned. Unfortunately the rounding logic for integers is somewhat harder because of the differences between two's complement and sign-magnitude form. Incrementing a sign-magnitude number always increases the magnitude, so the incremented number is farther away from zero. The same thing happens for positive two's complement numbers, but negative two's complement numbers become closer to zero when incremented. This means that the rounding logic has to change based on whether the integer is positive or negative.

It also means we have to be careful in picking the base value (the value which will be incremented or not). For positive integers, that value is just the truncated FP significand, so 1.37 will have a base value of 1, and a result of either 1 or 2. For negative integers, we again truncate the significand and take the one's complement of the result (one's complement is the original number with all bits inverted), −1.37 is truncated to 1 and then inverted, giving a base value of −2. Everything then works out since we want our result to be either −2 or (when incremented) −1.

To further complicate things, our method of conversion requires some computation to find L, G, and S for negative integers. Correct rounding would require us to complete the two's complement process (invert and add 1) and then compute L, G, and S, but adding that 1 is slow compared to just inverting. Ideally we would like to compute the actual L, G, and S from the original shifted input (i.e., from the input before we've done anything about signs. So the floating-point 1.37 or −1.37 would both be right shifted to the integer 1).

Let L0, G0, and S0 be the least significant bit (lsb), guard and sticky before inverting, and let Li, Gi, and Si be lsb, guard and sticky after inverting, and finally let L, G, and S be the lsb, guard and sticky after inverting and adding 1.

If S0 is zero, then the bits contributing to Si are all ones, and hence S (obtained by adding 1 to those Si bits) is also zero. If S0 is nonzero, then Si is not all ones, and hence S is nonzero. So in all cases S0=S.

If G0 is zero, then Gi is 1, and G is also one except for the case when there is a carry-in from the S bits, which only happens when S0 is zero. If G0 is 1, then Gi is zero, and again G is also one except for the case where there is a carry-in from the S bits, which only happens when S0 is zero. So G=G0^S0.

By very similar logic, L=L0^(G0|S0).

Now that we have L, G, and S for both negative and positive integers, we can come up with our rounding rules:

TABLE 6

| Mode | change to a positive value | change to a negative value |
|---|---|---|
| RNE | increment if (L&G) | (G&S) | increment if (L&G) | (G&S) |
| RNA | increment if G | increment if (G&S) |
| RZ | none | increment if (G|S) |
| RP | increment if (G|S) | increment if (G|S) |
| RM | none | none |
| RX | set L if G|S | set L if G|S |

Fixed-point numbers round exactly the same way as integers. The rules for unsigned conversions (to integer or fixed-point) are the same as the rules for positive conversions.

Injection Rounding

A faster way to do rounding is to inject a rounding constant as part of the significand addition that is part of almost every FP operation. To see how this works, consider adding numbers in dollars and cents and then rounding to dollars. If we add $1.27
+ $2.35
$3.62

We see that the sum $3.62 is closer to $4 than to $3, so either of the round-to-nearest modes should return $4. If we represented the numbers in binary, we could achieve the same result using the L, G, S method from the last section.

But suppose we just add fifty cents and then truncate the result?

1.27

+ 2.35

+ 0.50 (rounding injection)

4.12

If we just returned the dollar amount ($4) from our sum ($4.12), then we have correctly rounded using RNA rounding mode. If we added $0.99 instead of $0.50, then we would correctly round using RP rounding. RNE is slightly more complicated: we add $0.50, truncate, and then look at the remaining cents. If the cents remaining are nonzero, then the truncated result is correct. If there are zero cents remaining, then we were exactly in between two dollar amounts before the injection, so we pick the even dollar amount. For binary FP this amounts to setting the least significant bit of the dollar amount to zero.

Adding three numbers is only slightly slower than adding two numbers, so we get the rounded result much more quickly by using injection rounding than if we added two significands, examined L, G, and S, and then incremented our result according to the rounding mode.

Implementing Injection Rounding

For FP, the rounding injection is one of three different values, values which depend on the rounding mode and (sometimes) the sign of the result.

Both RNA and RNE require us to inject a 1 at the G position (this is like adding $0.50 in our dollars and cents example).

RP and RM rounding depends on the sign as well as the mode. RP rounds positive results up (increases the magnitude of the significand towards positive infinity), but truncates negative results (picking the significand that is closer to positive infinity). Similarly RM rounds negative results up (increasing the magnitude of the significand toward negative infinity), but truncates positive results (picking the significand that is closer to negative infinity). Thus we split RM and RP into two cases: round up (RU) when the sign matches the rounding direction, and truncation (RZ) when the sign differs from the rounding injection. For RU cases we inject a 1 at the G-bit location and at every location that contributes logically to S (this is like adding $0.99 in our dollars and cents example).

For RZ and RX modes, and for RP and RM modes that reduce to RZ mode, we inject zeros.

For most of the rounding modes, adding the rounding injection and then truncating gives the correctly rounded result. The two exceptions are RNE and RX, which require us to examine G and S after the addition. For RNE, we set L to 0 if G and S are both zero. For RX we set L to 1 if G or S are nonzero.

FP Number are not Real Numbers

It's tempting to think of FP numbers as being just like real numbers, but they are fundamentally different, even for the most basic properties:

They are not associative. For example, in SP we can add 3 numbers and return 1 million or zero, perhaps not what people think of as a rounding error:

$(2^{45}+2^{45})+2^{20}=2^{20}$ $2^{45}+(-2^{45}+2^{20})=0$

They don't obey the distributive laws. Again in SP:

3,000,001*(4.00001+5.00001)=0x4bcdfe83

(3,000,001*4.00001)+(3,000,001*5.00001)= 0x4bcdfe82 and things get even worse in the presence of overflow:

$2^{50}*(2^{78}-2^{77})=2^{127}$ $(2^{50}*2^{70})-(2^{50}*2^{77})=\text{infinity}$ For some implementations, they aren't even commutative unless we are in default NaN mode (a mode that converts all NaNs to a single NaN), because in general nanA+nanB !=nanB+nanA. Numeric adds and multiplies are commutative.

Because of IEEE NaN rules, there are no multiplicative or additive identities. One and zero work as identities for numeric values.

One useful way to think of FP numbers is to consider them to be very long fixed-point numbers in which at most a few (53 for DP) consecutive bits can be nonzero. For example, non-infinite DP numbers can have the first bit of the significand in any of 2046 places, and that first bit is followed by 52 other significant bits, and there is a sign bit, so any finite DP number can be represented as a 2046+52+1=2099-bit fixed point number. Examined this way it becomes very obvious that adding two FP numbers does not, in general, result in another FP number: the result of the addition has to be rounded so that it becomes an FP number.

A known issue with floating-point (FP) arithmetic is that it is non-associative, a fact that makes sums problematic:

programmers need to worry about wildly different results, even when adding 3 numbers programmers use wider formats than they need, in the hope of avoiding the wildly different results programmers can't easily parallelize code, because sums aren't reproducible unless computed in the exact same order.

For example, in single precision, $2^{20}+(-2^{44}+2^{44})=2^{20}$ but $(2^{20}+-2^{44})+2^{44}=0$ Depending upon the order the operations are performed, the result is one million or zero. This is an extreme example because the exponents differ by 24, but we can get different answers if the exponents differ by 1, or even if all of the exponents are the same and we are adding more than 3 things. The C programming language addresses the reproducibility problem by requiring sums to be evaluated left-to-right, in order, but this does nothing for correctness, and makes parallelization impossible.

The problems are especially acute for high-performance computing (HPC), where programs may need to add millions of things. Programmers would like to parallelize these problems, but then the lack of reproducibility makes debugging even harder than it usually is. Different configurations of machines will produce different answers even if the reprogramming for those machines is done perfectly.

HPA Representation (Anchored-Data Values)

A new datatype has been proposed that allows fast and correct accumulation of floating-point (FP) numbers in a programmer-selectable range. For the modest ranges that will accommodate most problems, the accumulation is faster than FP addition, and is associative. Associative addition allows the problems to be parallelized while still giving reproducible and correct results, enabling speedups by, for example, a factor of 100 or more as compared to existing hardware. We believe these benefits will be irresistible in the high-performance computing (HPC) space, and compelling for many non-HPC applications.

FIG. 1 schematically illustrates a data processing apparatus 2 for performing data processing operations under control of program instructions. A data processing apparatus 2 comprises a memory 4 storing program instructions 6 and data 8 to be processed. A processor core 10 is coupled to the memory 4 and includes a register bank 12, processing circuitry 14, an instruction fetch unit 16, an instruction pipeline unit 18 and an instruction decoder 20. It will be appreciated that in practice the data processing system 2 may include many additional elements and that the representation of FIG. 1 is simplified to aid understanding. In operation, program instructions 6 are fetched from the memory 4 by the instruction fetch unit 16 and supplied to the instruction pipeline 18. When the program instructions reach the appropriate stage within the instruction pipeline 18 they are decoded by the instruction decoder 20 and generate control signals which serve to control the operation of the register bank 12 and the processing circuitry 14 to perform the processing operation(s) specified by the program instruction decoded. Multiple input operands may be read from the register bank 12 and supplied to the processing circuitry 14 where they are manipulated and then a result value written back into the register bank 12.

The register bank 12 can have a variety of different forms. The operands to be manipulated may, for example, include floating-point operands, fixed point operands, integer operands and HPA or RHPA number operands (as will be described later). The register bank 12 may serve to store a mixture of these types of operands depending upon the configuration of the register bank 12. The operands can have differing levels of precision, as may be predefined by their format, or as may be programmably specified using metadata associated with the registers as will be described later in relation to the HPA number operands.

As shown in FIG. 1, the register bank 12 may include metadata registers 22 for specifying metadata associated with an HPA or RHPA value stored in a corresponding data register of the register bank 12 (examples of the contents of the metadata are given below). In some cases, each data register may have corresponding metadata registers 22, while in other cases two or more data registers may share metadata specified by a single metadata register 22.

Figure 2:
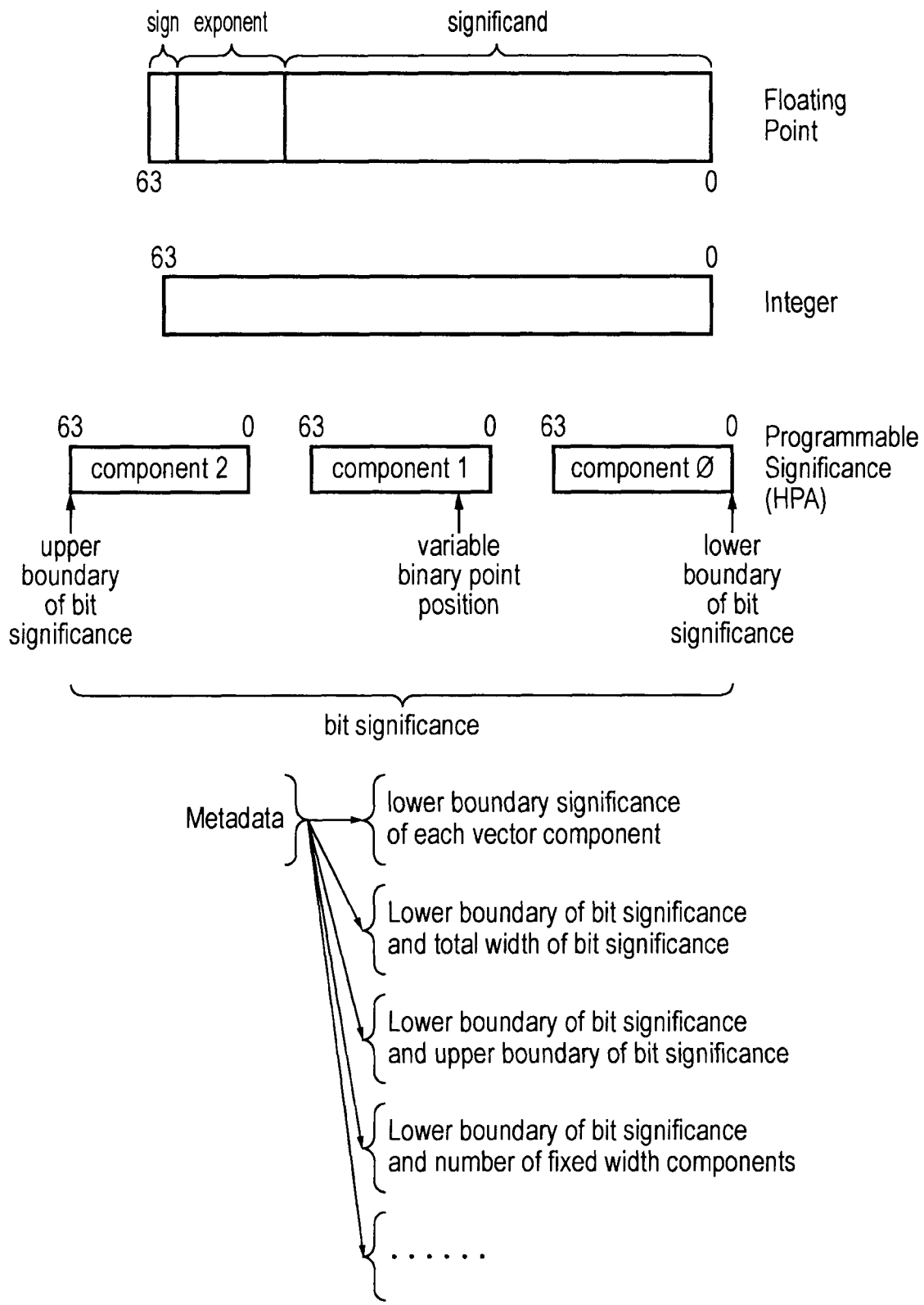
FIG. 2 schematically illustrates different representations of numeric values.

FIG. 2 schematically illustrates a floating-point operand. A floating-point operand is formed of a sign, an exponent and a significand. Floating-point operands can represent values with a wide variety of magnitudes indicated by their exponent values. The precision with which a number can be represented is limited by the size of the significand. Floating-point operations typically are more complex and slower to implement than integer arithmetic.

FIG. 2 also illustrates a 64-bit integer operand. Such an integer operand can represent numbers in the range 0 to $(2^{64}-1)$ for unsigned integers, or $-2^{63}$ to $2^{63}-1$ for signed integers. Integer arithmetic is typically quick and consumes comparatively little energy to perform (compared to floating-point arithmetic), but suffers from the disadvantage that numbers of a comparatively limited range of values may be specified compared to the range of numbers which may be represented by a floating-point value.

FIG. 2 also illustrates an HPA (high-precision anchor) number comprising a vector of multiple components (in this example three) each comprising a 64-bit integer in this example. The HPA number has metadata associated with it. The metadata includes an anchor value indicating a significance of the bits of the components forming part of the HPA number. The anchor value(s) specifies directly, or indirectly, a lower boundary of the bit significance and an upper boundary of the bit significance. The term metadata used below can be considered to correspond to data including the anchor value(s) that specify the bit significance of an HPA number. The different components together specify the bit values which contiguously span this range of bit significance. Depending upon the position of the lower boundary of the bit significance and the upper boundary of the bit significance, the range of bit significance may include the binary point position. It is also possible that the binary point position may lie outside of the range of bit significance specified for a particular HPA value.

The anchor value(s) may be provided so that they are capable of representing a range of bit significance extending from a smallest significance that can be represented by a floating-point value (e.g. a double precision FP value) up to a highest bit significance that can be represented by that floating-point value.

The number of components which form the HPA number can vary between different implementations. The size of the components may be fixed in some embodiments, but in other embodiments may vary. The overall width of the range bit significance may in some embodiments be constrained to change in units of a fixed component size (e.g. with 64-bit components, the range of the bit significance may have a width of, for example, 64, 128, 192, 256, . . . ). It is also possible that the width of the range of bit significance could vary continuously in steps of one bit width.

The anchor value(s) (within the metadata) may be programmable, so that the programmer can set the significance of the corresponding HPA value. The anchor value may specify the bit significance in a variety of different ways. One example is to specify the lower boundary bit significance of each vector component. Thus, each vector component may comprise an integer value representing its portion of the significant bits of the value within the overall range of bit significance together with metadata representing (anchoring) the significance of the lowest bit within that component. Another option is that the anchor value(s) specifies the lower boundary of the bit significance of the whole HPA number together with the total width of the range of bit significance. A further option is that the anchor value(s) may comprise data specifying the lower boundary and the upper boundary of the range of bit significance. Still further variations are also possible, such as anchor value(s) comprising the lower boundary of the range of bit significance together with the number of the components where those components are known to be fixed width components.

Figure 3:
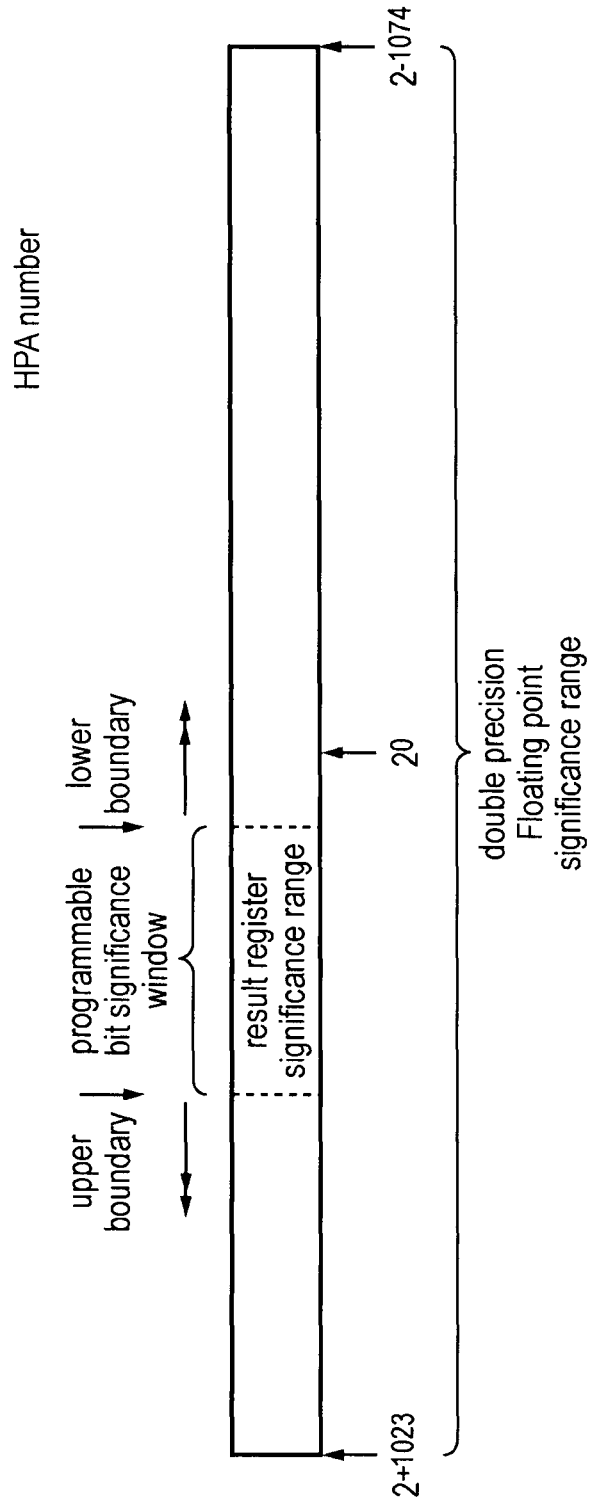
FIG. 3 schematically illustrates an example of a relationship between a double precision floating-point value and a high-precision anchor (HPA) value.

FIG. 3 schematically illustrates a relationship between the range of values representable with a double precision floating-point and the significance range of an HPA number. In the case of a double precision floating-point number, the range of bit values which may be specified extends from approximately $2^{-1074}$ to $2^{+1023}$ (not counting subnormals).

As illustrated, the HPA number has a programmable bit significance range which may be considered as a window of bit significance within the range of bit significance representable using the floating-point value. This programmable bit significance may be specified by a lower boundary and an upper boundary, and depending upon the values of the lower boundary and the upper boundary, may be considered to slide along the range of bit significance provided by the floating-point value. The width of the window, as well as its starting point and ending points, may be specified by appropriate values of the programmable metadata (that includes the anchor value(s)) which specifies the bit significance. Thus the HPA number may have a form selected by the programmer to match the computation to be performed.

The HPA format allows additions of two or more values to be performed fast, exactly and associatively, while still permitting values over a broad range of significance to be represented. Since the HPA value is simply a two's complement number it can be added using an integer adder and there is no need for rounding or normalisation as with floating-point arithmetic, which allows a series of additions to be parallelized because the result will be the same regardless of the order in which the values are added. Nevertheless, by defining metadata specifying a programmable significance of the HPA value, then the full range of significance of an equivalent floating-point value can still be represented, but without needing to provide a very wide adder (e.g. to add two 2's complement numbers across the full range representable by double precision floating-point values would require a 2098-bit adder), and instead the programmable significance enables a smaller adder to focus on a particular window of programmable bit significance within the larger range. In practice, most calculations do not require the entire range of significance available for double precision floating-point. For example, sub-atomic problems might accumulate very small values and astronomic complications might accumulate very large values, but it is not generally useful to add the width of a proton to the distance between galaxies. Even for high-performance computing, most accumulations happen over a limited range.

Typically, the programmer writing a program will know the expected range of values in which useful results are likely to fall (depending on the application). The programmer might determine that all of the data for a particular sum will have a magnitude less than $2^{80}$ and that values with magnitude below $2^{-50}$ will not affect the sum in any meaningful way, and so in this case by adding the data using the HPA format with an overall data width of 128 bits and the anchor value specifying the significance of the least significant bit as −50, the numbers for this particular application can be added associatively in any order.

Hence, by using the anchor value to limit the significant range for which the result is being calculated, a relatively small piece of hardware can be used to calculate the result within the programmably defined window. If an addition results in overflow above the upper significance boundary or underflow below the lower significance boundary of the defined range, then an exception can be raised and this can signal that the programmer has defined the wrong significance boundaries and that the processing should be repeated with different metadata (e.g. a different anchor value or a different overall size of the HPA value) to define a different window of significance for the result.

When adding or subtracting two HPA values, the anchor value is the same for both HPA values and the result also has the same anchor value—this is unlike floating-point arithmetic where the addition or subtraction of two values can lead to a result with a different exponent to either of the inputs due to normalisation of the result. If the inputs are provided with different anchor metadata then they are shifted to align themselves with the required target significance range for the result. If the inputs are provided in a representation other than HPA (e.g. integer or floating-point), then they are converted into HPA values sharing the same anchor value, and added to form a result having the same anchor value. Hence, the metadata for an HPA register can be viewed as defining a target range of significance for the result value to be generated in that register, and bits outside the target range of significance will not be calculated by the hardware regardless of the actual significance of the input values.

RHPA Representation

While the HPA format enables much faster additions compared to floating-point, when the size of an HPA value becomes relatively large then adding two HPA values with integer arithmetic may still be relatively slow. For example, the HPA format may require addition of operands spanning multiple lanes, which may be undesirable in larger vector implementations. For example, addition of two 256-bit or 512-bit values may take some time because each 64-bit lane of addition may be performed sequentially to accommodate carries from one lane being input to the following lane.

The addition can be performed faster by using the Redundant High-Precision Anchor (RHPA) format shown in FIG. 4. As in the HPA format, the RHPA number includes a variable number of components with metadata defining an anchor value which enables the processing circuitry 14 to identify the significance of bits of each component. Again, the anchor value may be programmable. For RHPA, the metadata may identify the significance of each component in any of the ways described above for HPA. However, in the RHPA format, the numeric value is represented using a redundant representation where adjacent lanes of the vector include bits of overlapping significance, which allows constant-time addition regardless of the number of lanes being calculated. The redundancy enables operations such as addition, accumulation and multiplication to be carried out with shorter adders and without propagating carry information between adders. This greatly speeds up processing of data values.

As shown in part (1) of FIG. 4, an M-bit data value using the RHPA representation is divided into respective vector lanes (also referred to as components, elements or portions) each comprising N bits, where N<M. In this example N is 64 bits, but this is just one example and other lane sizes (e.g. 32 or 128 bits) are also possible. Each N-bit portion is divided into a certain number V of overlap bits and N-V non-overlap bits. In this example, the number of overlap bits V is the same for each N-bit portion, but it is also possible to have different N-bit portions with different numbers of overlap bits.

When an integer or floating-point number is converted to RHPA format, some of the non-overlap bits are populated with non-sign information mapped from the original integer or floating-point number, while the overlap bits are populated with sign bits. For lane-based addition and subtraction purposes each lane behaves like an N-bit signed two's complement number (with carries propagating from the non-overlap portion to the overlap portion if necessary), but when viewed from a multilane perspective the lanes form a redundant mixed-sign representation of a larger P-bit number. In the example of FIG. 4 there are four lanes and so M=256, but the number of lanes can vary depending on the hardware implementation and/or the metadata defined for a given RHPA number.

Part (2) of FIG. 4 shows the relative significance of each bit of the RHPA number shown in part (1). The overlap bits V[0] of the least significant lane have the same significance as the V least significant bits of the non-overlap bits NV[1] of the next lane. Likewise overlap bits V[1] and V[2] have the same significance as the V least significant bits of non-overlap bits NV[2] and NV[3] respectively. The overlap in significance between lanes means that the RHPA number as a whole represents a P-bit value which is smaller than the total number of stored bits M. If V is the same for each N-bit portion (other than the top portion), then P=

$$P = M - V\left(\frac{M}{N} - 1\right).$$

More generally, if different lanes can have different numbers of overlap bits, P=M−ΣV, where ΣV is the total of the number of overlap bits in each lane other than the top lane.

In each overlapping portion of the P-bit value, the actual bit values of that P bit number are represented by the sum of the overlap bits V of the lower lane and the non-overlap bits NV in the higher lane (taking into account any carries that may be caused by adding the non-overlap bits NV and the overlap bits in lower lanes). Hence, one way of converting the RHPA value to an equivalent integer value is shown in part (3) of FIG. 4, where the overlap bits in each lane are sign-extended and added to the non-overlap bits of the higher lane (from low order to high order, adjusting the overlap bits after each lane addition).

The RHPA number is redundant in the sense that there is more than one way to represent a given P-bit number using the M bits of the RHPA value. For example considering the overlap in the lowest two lanes, in an example where the number of overlap bits V=4, if the corresponding bits of the P-bit value are 1111, then one way to represent this would be to have the overlap bits V[0]=0b0000 in the lower lane and the non-overlap bits NV[1]=0b1111 in the next highest lane. However, other ways of representing the same values could be V[0]=0b0101 and NV[1]=0b1010, or V[0]=0b1111 and NV[1]=0b0000, say.

Note that the overlap bits V[3] in the highest lane are not really overlap bits because there is no higher order lane to overlap with. Hence, it can often be useful to consider the high order lane as having all non-overlap bits. Hence, in some cases the top lane may be considered to be formed entirely of non-overlap bits (so that the most significant bit of the P-bit value as a whole corresponds to the most significant bit of the M-bit value in the top lane).

However, in other embodiments, it may be preferable to treat the top lane as having overlap bits too, so that the most significant bit of the P-bit numeric value represented by the RHPA corresponds to the most significant bit of the non-overlap portion (excluding the overlap portion) of the top lane. This approach may make circuit implementation easier if it allows each lane to be processed in a more symmetric manner (with fewer modifications to the way the top lane is processed compared to other lanes).

By representing a P-bit numeric value in a redundant form as shown in FIG. 4, several RHPA numbers can be added without carries between lanes, because any carries from additions of the non-overlap portions in a given lane can be accommodated within the overlap portion of the same lane, without needing to propagate carries through to the next lane. The addition performed in each lane simply sees two or more N-bit signed integers which are added by performing a conventional N-bit two's complement addition, which is entirely independent of the corresponding N-bit additions in other lanes. This means that each of the N-bit additions can be performed in parallel, so that regardless of the number of lanes, the entire M-bit values can be added in the time taken to perform a N-bit addition.

In fact, at least $(2^{V-1}-1)$ such RHPA numbers can be added without carries between lanes, with any carries from the addition of non-overlap portions being collected in the overlap portion (if there are lanes having different numbers of overlap bits, then V in this expression would be the minimum number of overlap bits in any given lane having overlap bits). The $(2^{V-1})$th addition would be the first that could possibly generate a carry between lanes (because the top overlap bit is a sign bit, lane overflow occurs when there is a positive or negative overflow from the second most significant overlap bit, which when starting from an RHPA number where all the bits are 0 can occur after a minimum of $2^{V-1}$ further additions have been performed). For example, if V=14, this would allow at least 8191 RHPA numbers to be added to the accumulator (i.e. 8192 values added in total) before there is any risk of overflow from a single lane. This is particularly useful for the high performance computing field where addition of many input values is common. In practice, as not every addition will cause a carry into the overflow portion, sometimes more than $2^{V-1}$ accumulations are possible without overflow from the top bit of the N-bit portion.

Occasionally, if enough additions have been performed to cause a risk of overflow (or an actual overflow) from the top bit of an N-bit lane, then an overlap reduction operation can be performed to convert a given RHPA value to a second RHPA value in which the overlap bits represent a smaller magnitude than the overlap bits of the given RHPA value, to effectively free up bit space in the overlap portions for accommodating more carries. Also, when converting an RHPA number back to another format such as integer or floating-point, such overlap reduction may also be performed. However, in practice, such an overlap reduction operation may not be required often, and so by allowing M-bit additions of multiple inputs to be performed in the time taken for an N-bit addition, RHPA enables a great saving in processing time. Note that the term "overlap reduction" does not imply that the overlap bits in every lane must be reduced to a smaller magnitude. It is enough that at least one lane has its overlap bits reduced in magnitude, and it is possible that some forms of overlap reduction could lead to overlap bits in a given lane increasing in magnitude.

Efficient Storage and Manipulation of HPA Numbers

For the following description, it will be assumed that the HPA form used is the above discussed RHPA form where each portion includes a number of overlap bits, but the techniques described herein are equally applicable to other HPA forms, for example HPA forms where the different portions do not include overlap bits. Hereafter, the term HPA will be used to refer to the HPA values being manipulated, irrespective of whether they are in redundant form or not.

As will be apparent from the earlier discussed FIG. 4, the different HPA portions (anchored-data elements) of an HPA number (anchored-data value) may be located within different lanes of a single vector register. However, this gives rise to a number of potential issues. For example, when creating the HPA form from a floating-point operand, the fraction of the floating-point operand needs to be propagated to all of the lanes within the relevant vector register, along with a desired anchor value. Each lane will then have a different lane anchor based on the anchor value. Further, it can result in wasteful use of the vector register resource, in situations where the vector registers are significantly larger than the long integer value of the HPA number, for example where a 1024-bit register holds a 200-bit long integer of an HPA number. Further, processing can be problematic if a vector register has an insufficient number of bits to represent all of the portions of the long integer of the HPA number, for example if the vector register is 128 bits wide and a 200-bit long integer of an HPA number needs to be represented.

In the examples discussed hereafter, an alternative storage arrangement is provided for the various portions of an HPA number. In particular, the long integer of an HPA number is arranged so as to be stored within a common lane across multiple vector registers, as illustrated schematically in FIG. 5A. In particular, a set of vector registers 100 are provided, where each vector register can be considered to consist of a plurality of sections for storing data values. Further, a plurality of lanes can be considered as extending through the vector registers (in a vertical direction in the orientation illustrated in FIG. 5A), the first four lanes being denoted by the reference numerals 102, 104, 106, 108 in FIG. 5A. The long integer of an HPA number can then be stored within a common lane by storing different portions of the HPA integer value in different vector registers. This is illustrated schematically for the example HPA integer 110, which is considered to consist of four portions, one portion being stored in each of the vector registers Z0, Z1, Z2 and Z3. Further, all of the portions are stored within the common lane 102. By storing the integer of the HPA number in this way, this gives rise to a number of significant benefits. For example, the size of the integer is not constrained by the width of an individual vector register. Further, inefficient utilization of the vector registers can be avoided, since multiple HPA integers can be stored in different lanes across the various vector registers, with those integer values then being able to be operated on in parallel in a SIMD fashion. For example, considering FIG. 5A, if each of the vector registers shown in FIG. 5A were to provide 16 lanes, then 16 HPA numbers can be stored within the four vector registers Z0 to Z3, each HPA number occupying a different lane. Hence, it can be seen that this approach significantly improves scalability and provides a technique which is vector length agnostic. This hence allows the technique to be adopted in a wide variety of different systems, each of which may operate using different sized vector registers. There are hence many applications where the use of such a storage technique for the HPA values will give rise to significant performance benefits, but one example is in association with systems adopting the Scalable Vector Extension (SVE) proposed by Arm Limited.

Arm Limited has announced the Scalable Vector Extension (SVE) to its 64-bit ISA, targeted at scientific HPC applications. While SVE does not currently include HPA support, it is continuing to evolve, and a few modest additions to its instruction set would enable very high HPA performance. The "scalable" part of SVE refers to it not requiring the same vector length for all implementations: SVE vectors can be implemented in hardware as any multiple of pairs of 64-bit lanes, from 128 to 2048 bits. A small chip might only implement 128-bit vectors, while a supercomputer might implement 1024 or even 2048-bit vectors. Holding a 200-bit integer within a single SVE register would be impossible on a 128-bit implementation, and wasteful on a 2048-bit implementation, but holding some number of 200-bit integers spread across 4 of these registers takes full advantage of the scalability of SVE, and works well on any hardware implementation, from small to large. It also frees the programmer to use shorter or longer integers as required: 100-bit integers could fit in corresponding lanes of 2 vector registers, and 500-bit integers could fit in corresponding lanes of 10 vector registers.

For performance and area reasons, SVE performs arithmetic within 64-bit lanes. We propose doing HPA addition by breaking large i HPA numbers into smaller redundant pieces. Each 64-bit lane will hold a specified part of i (say p=50 bits, but this can be programmable), with the remaining 64−p bits used to keep carries within a lane. These remaining bits are referred to as "overlap" bits because they have the same numerical weight as the lsb's of the next most significant lane. The addition within a lane is just a normal 64-bit integer addition. Every $2^{64-p}$ cycles, (i.e. every 16,000 cycles or so for p=50), a redundancy elimination step may be required to prevent lane overflow, and at the end of every computation a lane-by-lane process will be required to obtain a non-redundant answer.

In order to convert an FP input f, to an HPA number format (i, a), each 64-bit lane examines the exponent of f, compares it to the anchor a, and then determines if any part of the significand of f should be added to the portion of i under consideration. This comparison may be done in parallel across all applicable lanes. While the significand of f might span two portions (or three portions for FP64 products, depending on the value of p), each portion can be created and manipulated independently.

An example conversion of an FP32 number into a two portion HPA with a chosen to be 0 and p chosen to be 50 is set out below. In this example, the FP32 number is assumed to occupy the "right-hand" 32 least significant bits of a vector register lane, and HPA numbers are assumed to occupy 64-bit register lanes (including a 50-bit value and 14 overlap bits). If the FP number is:

$f = +1.0110\ 1011\ 1010\ 0010\ 1111\ 011 \times 2^{60}$

FP32 significand, $f[23:0] = 1\ 0110\ 1011\ 1010\ 0010\ 1111\ 011$

Portion 1 of the HPA number will have an adjusted portion anchor=50 and is computed as follows:
i[1]=f [23:0] left shifted by (exponent−23)—portion anchor=37−50=−13 places (−ve left shift is +ve right shift→i[1]={{14 0's}, {39 0's}, f[23:13]=1 0110 1011 10}) (the adjustment of the exponent by 23 takes account of the fact that the exponent of a floating-point value represents the significance of the implied decimal point to the left of the most significant bit of the 23-bit fraction, whereas the anchor represents the significance of the least significant bit of the fraction).

The Portion 0 of the HPA number will have an adjusted portion anchor=0 and is computed as follows:
i[0]=f [23:0] left shifted by (exponent−23)−portion anchor=37−0=37 places→i[1]={{14 0's}, f [12:0]=10 0010 1111 011, {37 0's}}

Figure 5A:
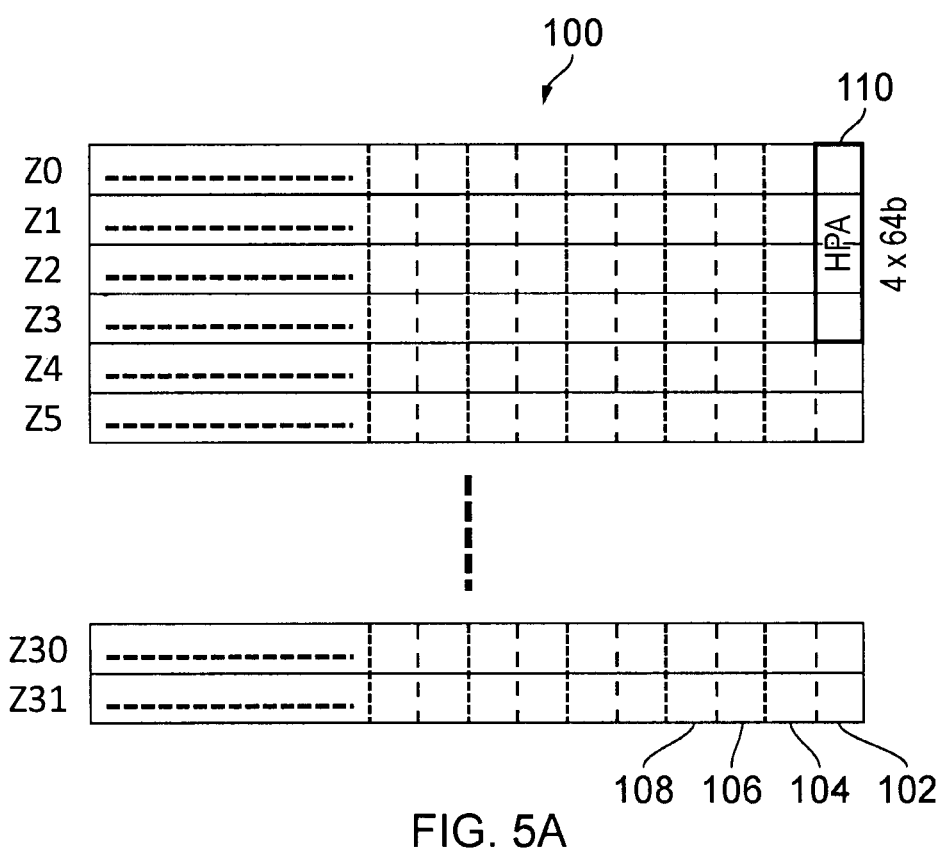
FIG. 5A schematically illustrates how an HPA integer may be stored within a selected lane across multiple vector registers, in one example.
Figure 5B:
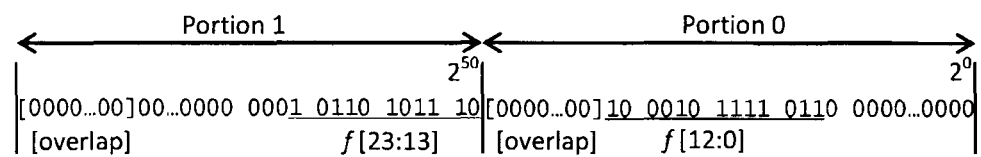
FIG. 5B shows an example of HPA form.

This results in the HPA form as shown in FIG. 5B.

Generally speaking, correctly rounding an HPA result to a single FP result has to be a sequential process, requiring lane-by-lane propagation of carry and rounding information. It would require several cycles, but only has to happen once for each accumulation. Alternatively, if p a non-redundant HPA number occupying several 64-bit lanes could be converted in parallel to a vector of FP64 numbers. The resulting vector should then be "renormalized" so that the most significant element represents the full HPA number to an accuracy of 0.5 ulp.

Having now described the fundamentals of HPA processing at a high level, we now describe in greater detail how an HPA accumulator might be implemented in SVE.

SVE supports vector register lengths of k×128 bits up to a current maximum of 2048 bits (i.e. 1≤k≤16) and is based on the concept of "Vector-Length Agnostic" (VLA) processing, whereby different CPUs with different SVE vector register lengths can all run the same SVE program. An SVE program reads the available vector length from a system register and "self-adjusts" to exploit the available vector register length. Consequently, SVE programs execute within 128-bit granules with the CPU processing as many granules in parallel as the available vector hardware length can support.

As mentioned earlier with reference to FIG. 5A, to achieve vector-length agnosticism, HPA numbers may be laid out across multiple SVE registers. Each register may hold bits of the same significance of different HPA numbers: that is, each register is associated with a significance that gives the value of the number's anchor adjusted relative to each portion's position in an HPA number.

Returning to the earlier example of a 200-bit HPA number with p=50 bits held in each portion, if the anchor of the HPA number is −80, the significance information for the four portions would be (+70, +20, −30, −80) with 14 overlapping bits per 64-bit portion. Note that there is no need for the individual portions of the HPA number to be stored in contiguous registers as per the example in FIG. 5A.

The primary advantage of laying out HPA numbers in this way is that they (or long integers) can be dealt with in SIMD fashion, even across SIMD implementations (e.g. 128-bit vectors) that may be shorter than the long HPA numbers. A secondary advantage is that longer SIMD implementations (e.g. 1024 bit vectors) are not wasted by storing much shorter HPA numbers within each vector. Provided that there are sufficiently many integers or HPA numbers, the vectors are fully utilized regardless of the SVE implementation length.

Laying out HPA numbers across several registers also allows HPA arithmetic to be highly parallelized with vectors of FP numbers being accumulated within their own 64-bit lanes. In addition, loading large quantities of FP numbers from memory reduces to simple and efficient contiguous vector loads. Finally, this layout of HPA numbers allows existing SVE instructions to be used to perform important HPA computations (such as eliminating redundancy or adding HPA numbers together) because a number of HPA integers can all be processed in parallel from low-order bits to the high-order bits. The scheme also speeds up the conversion and renormalization of HPA numbers to FP, again because multiple HPA numbers can all be processed simultaneously from high-order lanes to lower-order lanes, or low-order lanes to high-order lanes.

Figure 6:
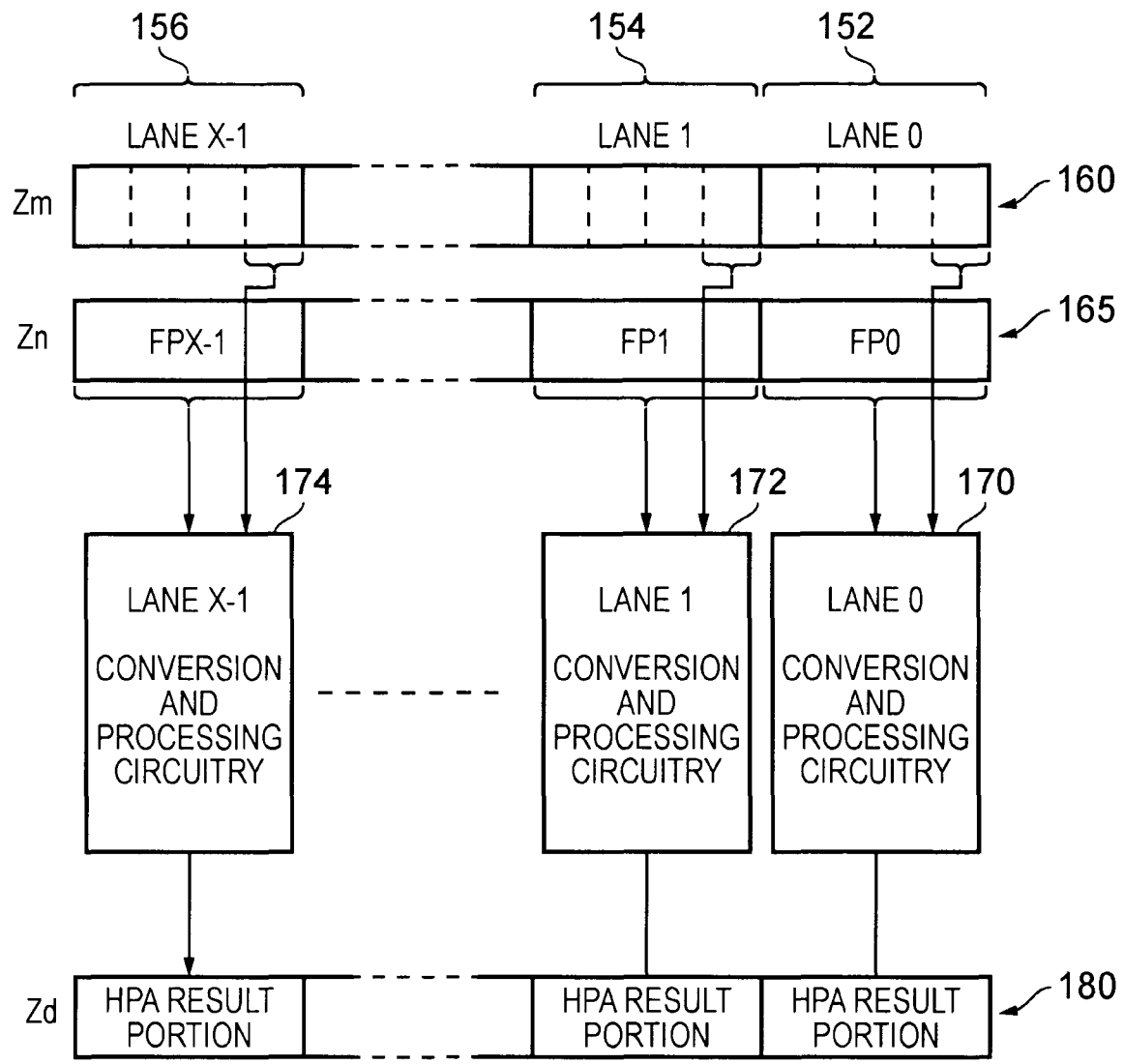
FIG. 6 is a block diagram schematically illustrating how floating-point numbers may be converted into HPA form and processed, in accordance with one example arrangement.

FIG. 6 illustrates how HPA numbers laid out in the manner discussed in FIG. 5A can then be processed in a SIMD manner. In this particular example it is assumed that a series of floating-point numbers are loaded into a source vector register 165. In this example, it is assumed that each floating-point number is a double precision floating-point number, and hence each floating-point number occupies a 64-bit section within the source register 165.

A plurality of 64-bit lanes 152, 154, 156 are considered to extend through the set of vector registers, and separate conversion and processing circuits 170, 172, 174 are associated with each lane. The circuits 170, 172, 174 are arranged to operate on a single portion of an HPA number at a time in order to produce a corresponding result portion to be stored in a destination register 180. It will be understood from the earlier discussed FIG. 5A that each result portion of an HPA result number will occupy a different destination register, and accordingly as the circuits process different portions of an HPA number the corresponding result portions will be written in different destination registers.

As will be discussed in more detail later, metadata is provided for reference by the conversion and processing circuits 170, 172, 174 when performing their conversion and processing steps. In particular, in this example metadata is stored for each lane within a further source register 160. Within a lane's metadata, a metadata portion is provided for each portion of the HPA numbers processed within that lane. The metadata will identify the significance (adjusted anchor) associated with the corresponding portion, and may identify other information, such as the number of overlap bits. When the circuits 170, 172, 174 are processing a particular portion of an HPA number, they will retrieve the associated metadata portion from the lane metadata maintained within the source register 160.

In the example shown in FIG. 6, each conversion and processing circuit will receive an input floating-point operand and the relevant metadata portion for the portion of the HPA number that is to be processed, and will then generate the relevant HPA portion from the input floating-point operand using for example the technique described earlier with reference to the example shown in FIG. 5B. The generated HPA portion could then be stored directly in the result register 180, or may be subjected to some processing function in order to generate the associated result portion. For example, in one embodiment an accumulation operation can be performed, where a current HPA result portion is retrieved from the destination register and then accumulated with the HPA portion generated from the input floating-point operand in order to produce an updated result portion that is then written back into the relevant section of the destination register 180.

By such an approach, it can be seen that via the performance of multiple iterations, multiple accumulate operations can be performed within each of the lanes in parallel in order to generate result portions representing the accumulated result. The process can also be repeated for each of the portions of the HPA number in order to produce a series of result portions within each lane, that collectively represent a result HPA value.

Figure 7:
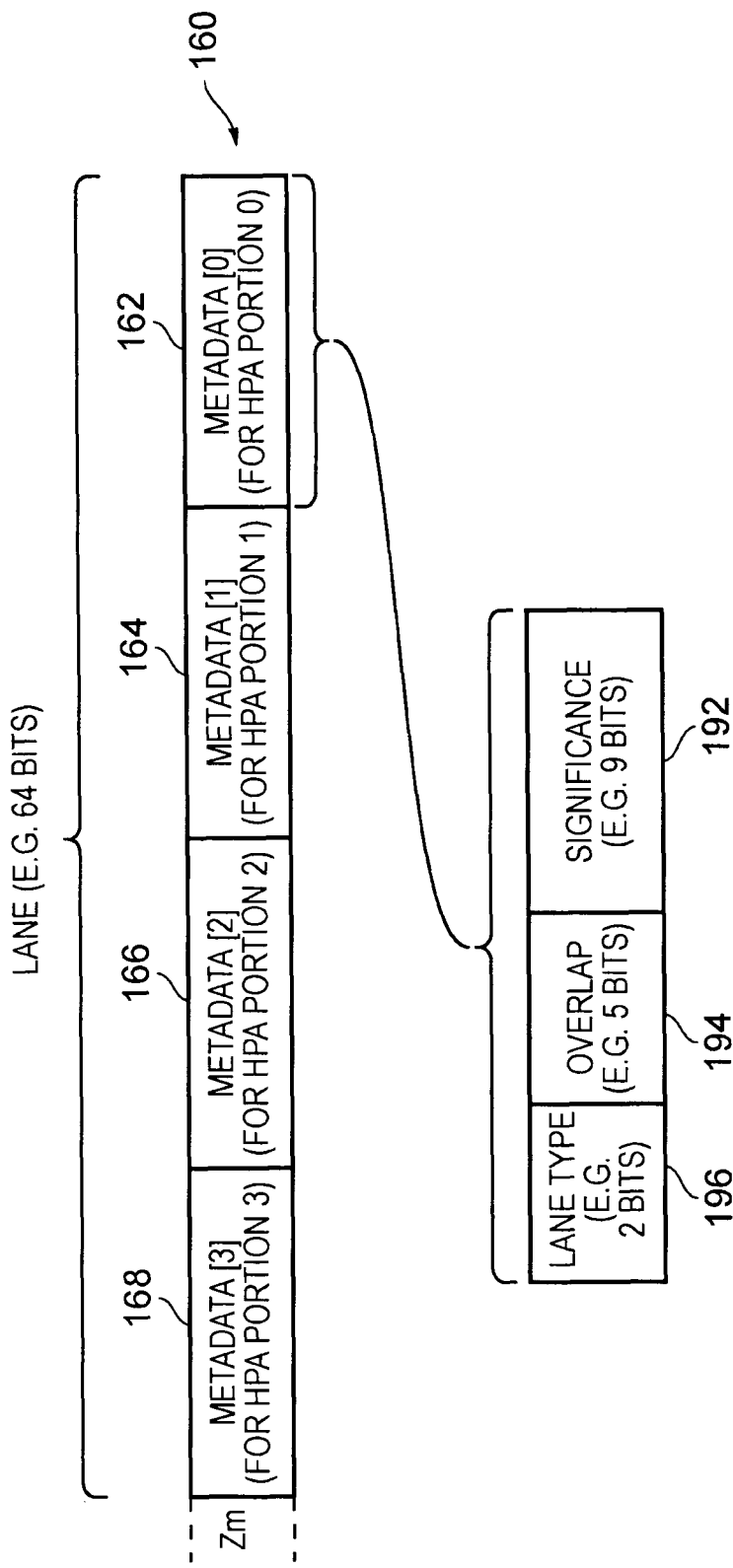
FIG. 7 schematically illustrates the form of metadata that may be used in one example.

In one example arrangement, the HPA processing requires information ("metadata") about the anchor, lane overlap and lane type or position within a wide number—top, bottom, or intermediate. It is anticipated that HPA numbers will typically be no more than 200 bits wide with an anchor range similar to IEEE FP32 so that HPA accumulators will normally comprise no more than four portions. Then the HPA metadata for a 200-bit accumulator traversing 4 64-bit portions can be organized as 4 16-bit fields, as shown in FIG. 7.

In particular, a source register 160 can be specified, where within each lane (for example 64 bits) four metadata portions are provided as indicated by the reference numerals 162, 164, 166, 168. Each metadata portion can then provide the metadata for an associated portion of the accumulator result. As shown by the expanded section in FIG. 7, the significance (adjusted anchor) information can be contained in a first sub-portion 192, for example using 9 bits, whilst the overlap information can be captured in a second sub-portion 194, for example comprising 5 bits. If desired, lane type information can also be captured in a third sub-portion 196, to identify whether the associated portion is the top portion (i.e. representing the most significant bits), the bottom portion (representing the least significant bits) or an intermediate portion.

Within any particular lane, the HPA values that are accumulated will all be arranged to have the same anchor, and accordingly the metadata for a lane will apply equally to all of the HPA values processed within the lane.

In principle, different metadata can be specified for each of the lanes, so that the values processed in one lane do not have to have the same anchor as the values processed in another lane. However, it will often be the case that all of the values processed within all of the lanes will be arranged to have the same anchor value, and in this instance the 64 bits of metadata can 11e stored and replicated across the whole vector register 160. This enables the various HPA results produced for each of the lanes to in due course then be readily accumulated with each other in order to produce a single scalar HPA result.

In such an arrangement, the SVE instructions for HPA that need to reference the metadata can specify the metadata register along with a 2-bit pointer to the particular 16 bits of metadata for the HPA portion being processed.

It should be noted that, whilst FIG. 7 illustrates one mechanism for providing the metadata, alternate schemes for storing the metadata in a more compressed manner could also be devised so that, for example, 8 lanes of metadata can be stored in 64 bits. In particular, the "lane type" field might not be needed and the ovlp and significance fields could possibly be reduced in size to reflect a limited number of available configurations.

An important HPA operation is converting and accumulating an FP number into HPA format. This operation may be performed on every FP number to be accumulated, whereas other HPA operations (conversion back to FP, eliminating HPA redundancy, etc.) occur thousands of times less frequently. Consequently, it is desirable to provide efficient hardware support for converting and accumulating FP numbers.

Figure 8:
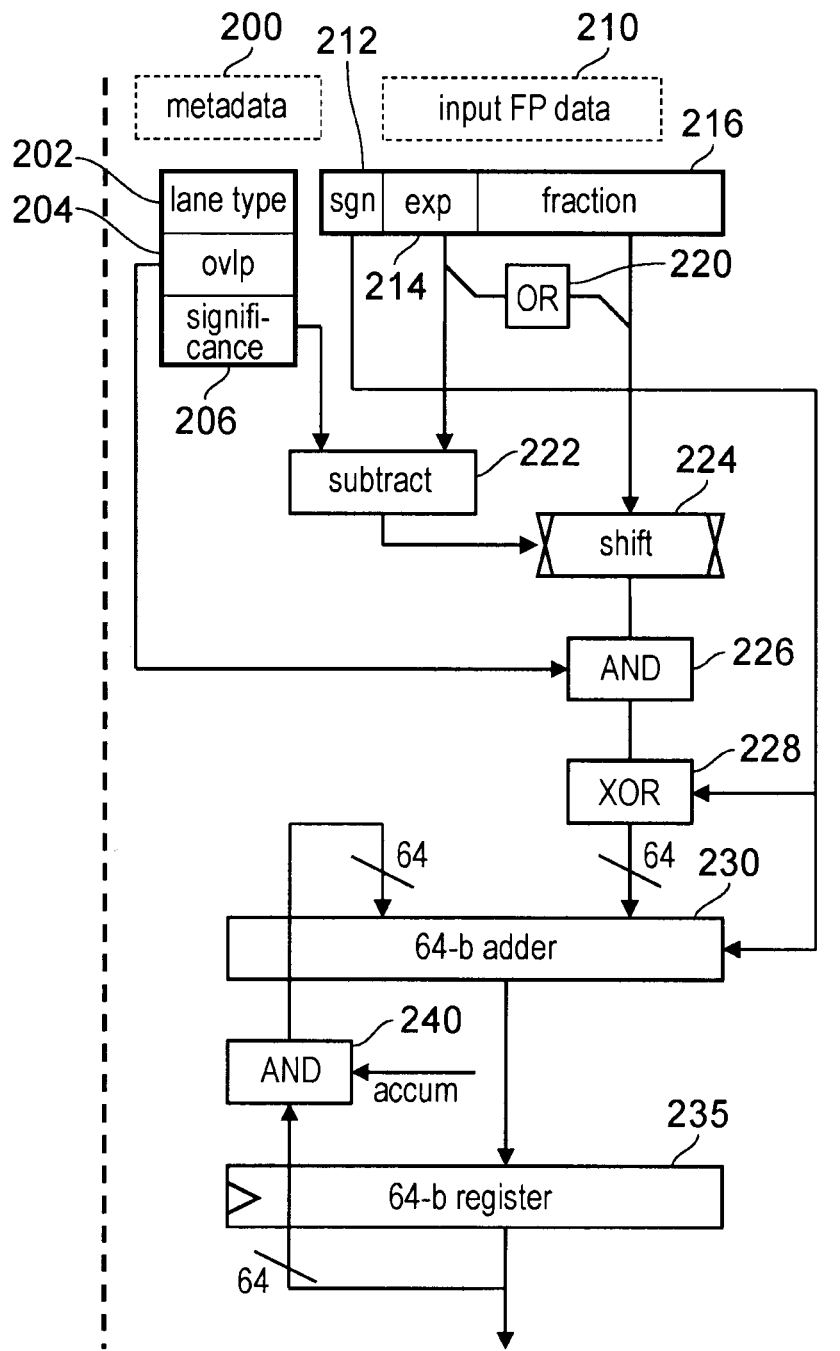
FIG. 8 is a diagram illustrating in more detail conversion and processing circuitry that may be provided in association with each lane, in one example.

FIG. 8 shows a possible 64-bit datapath for this operation that would be repeated across a vector unit, FIG. 8 hence representing in more detail an example configuration for each of the conversion and processing circuits 170, 172, 174 shown in FIG. 6.

Input floating-point data 210 consists of a sign portion 212, exponent portion 214 and fraction portion 216. The relevant metadata portion from the metadata held for a lane is then extracted as the metadata portion 200, this including a lane type field 202, an overlap field 204 and a significance field 206. The OR function 220 performs an OR operation on the bits of the exponent in order to generate the most significant bit of the significand, which is then prepended to the fraction bits 216 in order to form the significand. In particular, if the exponent is non-zero, this indicates that the floating-point number is a normal floating-point number, and accordingly the significand's most significant bit is a logic one value. However, if all of the bits of the exponent are zero, this indicates a sub-normal value, and accordingly the most significant bit of the significand should be set to zero.

The subtract block 222 is arranged to subtract the significance 206 from the exponent 214 (adjusted as necessary for exponent bias and fraction wordlength), for example using the technique described earlier with reference to FIG. 5B in order to produce a shift amount that is then used to control the shift circuitry 224 to shift the floating-point significand by the appropriate amount (performing either a right shift or a left shift as appropriate).

The AND circuitry 226 then receives the overlap information 204, and masks the output from the shift circuitry by the specified number of overlap bits (equal to 64−p). Thereafter, the XOR circuitry 228 performs a two's complement function on the output from the AND circuitry 226 if the floating-point number was negative, as indicated by the sign value 212. At this point, the bits of the input floating-point number pertinent to a particular HPA portion with a given significance and overlap amount are available as a two's complement number, and can be provided as one input to the adder circuitry 230 (the adder also taking a carry-in value of 1 if the floating-point operand is negative). As a result, it can be seen that the relevant HPA portion can be generated "on the fly" from the input floating-point value, and then subjected to a suitable processing operation in order to generate a corresponding result portion.

In the example shown, it is assumed that the processing operation is a selective accumulate operation. In particular, the AND circuitry 240 can be used selectively to propagate the current value held in the register 235 back as a second input to the adder 230, allowing a previous result portion to be accumulated with the input operand portion output from the conversion circuitry, in order to produce an updated result portion stored in the register 235. Incorporating a 64-bit adder and register in the manner shown supports pipelined execution of back-to-back HPA convert-and-accumulate instructions.

There are a number of ways in which the circuitry illustrated in FIG. 8 can be triggered to perform the above described operations, but in one embodiment a single instruction is used to initiate the above described functionality of FIG. 8. Such an instruction can be referred to as an FP-to-HPA convert-and-add instruction.

The opcode for an FP-to-HPA convert-and-add instruction (mnemonic "FCVTH{A}", where {A} denotes optional accumulation) in one example includes identifiers for an FP source register, the metadata register, the destination accumulator register, and an index to select a sub-field of the metadata register. This fits well with an SVE ISA design principle that opcodes reference no more than three vector registers.

Short sequences of existing SVE instructions can be constructed that implement other important HPA operations. Periodically, it is important to eliminate the redundancy of an HPA number in order to avoid portion overflow. This may be achieved by simply adding the accumulated carry bits in the overlap region of a lower HPA portion to the LSBs of the next highest HPA portion. In SVE this may be accomplished in a 3-instruction procedure:

(i) Arithmetic Shift Right the lower portion by p places;
(ii) Add the shifted overlap bits to the next higher HPA portion;
(iii) AND immediate the overlap bits with a mask derived from p in the lower HPA portion to force them to zero.

This procedure may be applied to every pair of adjacent HPA portions, working up from the lowest lane.

Alternatively, dedicated instructions for overlap propagation and overlap clearing may be provided as described with respect to FIGS. 13 and 14 below.

After a large block of FP numbers has been accumulated, the result will be stored in multiple accumulators laid across a number of SVE lanes. These accumulators may then be added together to return a scalar result for each vector of HPA lanes with the same index. In SVE this may be readily achieved by performing a vector reduce on the accumulators held in multiple HPA lanes to form a scalar HPA result. The resulting scalar HPA number may well contain carry bits in the overlap regions of each portion, and hence the redundancy elimination routine can then be run on the scalar HPA number before converting it back to FP form.

Finally, the accumulated reproducible HPA result may be converted back to floating-point format. An algorithm for converting an HPA portion to a normalized FP64 number exactly (i.e. assuming that $p \geq 53$) is as follows:

(i) perform a CLZ (count leading zeroes) to locate the position of the leading '1'
(ii) compute the exponent as significance+(63−CLZ)+ FP64 exponent bias
(iii) for all but the highest HPA portion, set bit[63] of the FP64 result to 0; set bits [62:52] of the FP64 result to the calculated exponent; if the biased exponent >0, logically shift left the HPA portion by CLZ−11 places: otherwise set the FP64 result to zero.

(iv) for the highest HPA portion only: if the portion is negative, set bit[63] of FP64 result to 1 and negate the portion to obtain a positive 2's-complement number; set bits [62:52] of the FP64 result to the calculated exponent; if the biased exponent >0, logically shift left the HPA portion by CLZ−11 places: otherwise set the FP64 result to zero.

This conversion algorithm can be implemented in typically 15 SVE instructions per HPA lane.

It should be noted that, if desired, the above steps (iii) and (iv) could be combined as follows to cover cases where portions that are not the most significant could be negative:

(iii) if the portion is negative, set bit[63] of FP64 result to 1 and negate the portion to obtain a positive 2's-complement number; set bits [62:52] of the FP64 result to the calculated exponent; if the biased exponent >0, logically shift left the HPA portion by CLZ−11 places: otherwise set the FP64 result to zero.

When desired, a single FP64 result can be produced that represents the final accumulated value as accurately as possible. This can be achieved for example by applying an algorithm suggested by Y. Hida, X. S. Li and D. H. Bailey, "Algorithms for Quad-Double Precision Floating Point Arithmetic," *Proc. 15th IEEE Symposium on Computer Arithmetic*, Vail CO, June 2001, pp. 155-162.

Working from the bottom pair of lanes up, the Fast2Sum operation is applied successively to the next higher lane and the upper sum obtained from Fast2Sum. Then, the process is repeated working form the topmost pair of values just obtained downwards and applied successively to the next lower value and the lower sum obtained from Fast2Sum. The top-most element of the resulting vector of FP64 numbers may then be guaranteed to be within 0.5 ulp of the HPA number.

An HPA accumulator comprising l portions has a wordlength of l·p bits and occupies l SVE vector registers. FCVTH{A} instructions executed on a k×128 bit SVE vector unit can convert and accumulate 2 k FP64 or 4 k FP32 numbers into one portion of 2 k HPA accumulators. FCVTH{A} instructions are fully pipelined so that a block of n FP64 addends can be accumulated into 2 k p·l-bit HPA accumulators in n·(l/2 k)+1 cycles. Typical values of l and k are 2−4 (although k could be as high as 16) so that, if l=k, n FP64 numbers (or 2n FP32 numbers) could be accumulated in k parallel accumulators in n/2 cycles. By contrast, on ARM's Cortex-A72, the same reproducible accumulation would require 3n cycles because the sums have to happen in order, and a dependent fused multiply-add (FMA) requires 3 cycles between adds. Thus HPA offers typically 12 times acceleration for FP32 accumulation over conventional FP processing.

As noted above, HPA redundancy would need to be eliminated or resolved periodically. The method described above takes 3·(l−1) instructions and would need to be performed once every $2^{64-p}$ accumulations: for a typical value of p=50, this represents a tiny processing overhead of <0.1%. Similarly, reducing a vector of HPA accumulators to scalar form, resolving redundancy in the scalar HPA, and converting the scalar HPA back to FP64 format would typically take 1+3·(l−1)+15·l≈19·l−3=35−73 instructions for a representative values of l, compared with ≈n/4 cycles for the HPA accumulation of n numbers with n≈$10^3$ or higher.

Figures 9, 10, 11:
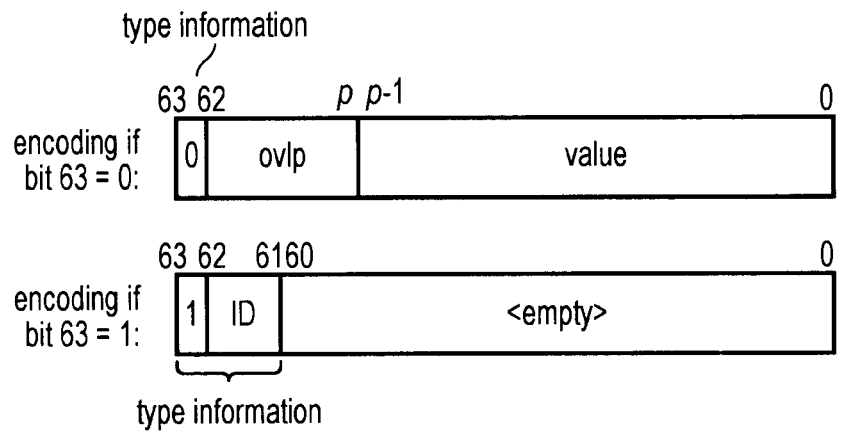
FIG. 9 illustrates encoding of an anchored-data element which includes type information indicating whether the anchored-data element represents a portion of bits of a two's complement number or represents a special value.
FIG. 10 shows an encoding of the type information.
FIG. 11 shows different outcomes for setting the type information of a result anchored-data element based on the type information of first and second operands.

FIG. 9 shows another example of an encoding for an anchored-data element which includes type information specifying whether the anchored-data element represents a portion of a two's complement number or a special value. Note that the type information in the anchored-data element is different to the lane type information 196 in the metadata as shown in FIG. 7. In this encoding the most significant bit (bit 63 in this example) is used to signify whether the element represents a standard HPA digit representing a portion of a two's complement number or a special value. When the most significant bit is 0 then the HPA element represents a standard HPA digit, representing a two's complement number, where the bits in the overlap portion have the same significance as the least significant bits of a next highest digit in the HPA value, similar to the examples described above.

However, when the most significant bit of the element is 1, the element represents a HPA special value selected from the set: positive infinity, negative infinity, not-a-number (NaN) and a saturated value. When the most significant bit is 1 then the next two most significant bits (e.g. bits 61 and 62 as shown in FIG. 9) represent the specific type of special value represented. FIG. 10 shows the encoding of bits 63 to 61 for the standard HPA digit and the respective types of special value.

Hence, when the most significant bit is 0 then the next two bits represent some of the overlap bits of the HPA digit. Alternatively, if a non-redundant HPA variant is used which does not have overlap bits, the next two bits may represent non-overlap bits of the HPA digit. Hence, the bits which would otherwise be used to signify which specific type of special value is encoded can be reused for representing bits of a two's complement number, which helps to provide an efficient encoding.

When the most significant bit is 1 and the third most significant bit is 0 then the HPA element represents an infinity. The second most significant bit represents the sign of the infinity. Hence an encoding of 110 for bits 63 to 61 of the element may represent negative infinity and an encoding 100 may represent positive infinity. It would also be possible for the encodings of positive and negative infinity to be swapped. When an HPA element is indicated as representing positive or negative infinity, then this means that it was generated in a sequence of operations in which at least one operation involved the conversion of a floating-point value to the HPA format, where that floating-point value was positive or negative infinity.

When the most significant three bits of the element indicate 101 then the element represents a not-a-number (NaN). This may arise in two ways. Either, the element may be generated in a series of operations which involves conversion of a floating-point value which was a NaN, or the element may depend on an addition of two HPA values where one of the HPA values was positive infinity and the other was negative infinity.

On the other hand, when the most significant three bits of the HPA elements are encoded as 111 then this represents that the value is a saturated HPA value. The saturated HPA value has nor analogue in the floating-point domain. Whereas the positive or the negative infinity indicates that the HPA value resulted from conversion of a floating-point value which was positive or negative infinity, where that floating-point value would have been derived from calculations which resulted in a number which is of greater magnitude than can be represented in the floating-point format, the saturated HPA type may indicate that while any floating-point numbers input to a series of HPA operations may have been non-special numbers which are not a NaN or infinity, saturation has arisen as a result of the HPA operations themselves, for example because the anchor metadata setting the range of significance that can be represented by the HPA value was such that the input floating-point values and/or the result of processing those values has generated a number which is outside the range defined by the metadata.

The saturated type could for example be generated when an HPA operation which is acting on the most significant HPA element of an HPA value (as indicated by the lane information 196 shown in FIG. 7) results in an overflow from the most significant overlap bit. Alternatively, if the overlap bits of the most significant HPA element and the HPA value are not considered part of the two's complement number represented by the HPA value then the saturated type may result if the most significant elements of an HPA value overflows from the most significant non-overlap bit to the least significant overlap bit. In the case where the overlap bits of the top element of the HPA value are considered part of the overall two's complement number represented by the HPA value, the encoding of the saturated type as 111 in bits 63 to 61 can be particularly useful because it will mean that, by definition, if there is an overflow from the top overlap bit the top two overlap bits will already both be equal to 1 and the overflow will result in the most significant bit of the element switching from 0 to 1, so that the overflow itself may cause the corresponding element to be set with the type information in the top three bits equal to 111. This can simplify the logic for setting the type information as it may not require a specific circuitry to detect the overflow and set the type information accordingly. On the other hand, if the overlap bits are not considered part of the two's complement number represented by the HPA value then some additional logic may detect the overflow from the top non-overlap bit into the overlap region, and set the top three bits of the type information accordingly.

Optionally, the saturated type could also be used when underflows occur in an HPA operation. For example, if a floating-point value to be converted into HPA format represents a number for which a precise representation in the HPA format would require some bits which are less significant than the least significant bit representable using the HPA format as defined by the anchor metadata, then this may be detected as an underflow and a saturated datatype could be indicated. Alternatively a type encoding which distinguishes overflows from underflows could be used. However, in practice overflows may be more important to signal than underflows since the underflows may simply lead to loss of precision whereas the overflow may result in the incorrect processing result being returned. Hence in some cases the choice may be made not to signal underflows using the datatype indicated by the type information.

Hence in general by providing the type information to support indication of a saturated type of HPA value, this can allow the program code to determine, after a sequence of HPA operations, whether any special values resulting from those operations were caused by the input floating-point numbers being special numbers or by an overflow occurring due to the HPA processing. This can be useful because in the second scenario the program code may be able to adjust the anchor metadata and then repeat the sequence of operations in order to maintain a valid result, whereas if the special values arose from the special numbers in the original floating-point values then repeating the HPA processing with different anchor metadata would still not produce a non-special result.

While FIG. 10 shows one particular encoding of the type information which can be useful for providing an efficient encoding scheme, other encoding schemes could also be used.

FIG. 9 shows the encoding for a single HPA element. When an HPA value is formed of two or more HPA elements then the overall value may be considered special if any one of those HPA elements has the top bit set to 1 to indicate a special value. In practice, as the HPA value may be striped across a number of different vector registers as shown in FIG. 5A, each HPA processing instruction may only see one element at a time and it may not be apparent when processing one of the HPA elements that one of the other HPA elements of the same vector value will detect a special value or overflow. While if an input floating-point value is an infinity or a not-a-number, this may result in all of the elements of the HPA value to which that floating-point number is converted being set to indicate a special value, in the case of saturation arising from the HPA process then the saturated type may only be indicated in the most significant HPA element of the HPA value for example.

When two HPA elements are added together, then the type information of the result element may be set depending on the type information in the two elements being added. FIG. 11 shows a table showing the different datatypes that can arise depending on the datatypes of the first operand and the second operand. The column on the left hand side of the table shows the different options for the data type in the first operand and the row along the top of the table shows the different options for the data type in the second operand. The abbreviation Num represents a standard two's complement number, i.e. the datatype when the most significant bit of the element is 0.

As shown in FIG. 11, if both the input operands being added are standard two's complement numbers then the result can either be another standard two's complement number, or the saturated value in the case where there is an overflow from the most significant element of an HPA value. In cases where at least one of the two operands being added is a special value, then the result will be special too. Hence, the most significant bit of an HPA element is sticky in the sense that once it is set to 1, all subsequent HPA elements which depend on that element will be generated with the most significant bit equal to 1 so that the occurrence of a special value can be detected at the end of a sequence of operations.

As shown in FIG. 11, if either of the operands being added is a NaN then the result will also be a NaN. A NaN can also result if one of the operands being added is positive infinity and the other is negative infinity. If one of the operands being added is positive infinity and the other is anything other than negative infinity or a NaN, then the result will be positive infinity. Similarly, if one of the operands is negative infinity and the other is anything other than positive infinity or a NaN then the result will be negative infinity. Finally, if at least one of the operands is a saturated value then the result will also be saturated if the other operand is either a standard two's complement number or a saturated value.

In some cases an exception may be triggered in response to an HPA addition which causes certain outcomes. In a case where the two operands being added were standard two's complement numbers but an overflow occurs and so the result is saturated, then an overflow exception may be signalled. For HPA elements other than the most significant element of an HPA value, this exception should not arise since the program code should trigger the overlap propagation operation after a certain number of HPA additions have been performed, where that number is selected so that that number of HPA additions cannot result in an overflow beyond the top overlap bit. However, for the most significant element it is possible that the overflow could occur if the anchor metadata has not been set correctly.

If adding unlike signed floating-point infinities, so that the result is set to a NaN, then then an invalid operand exception could be raised.

Other types of exceptions could be raised when converting from floating-point to HPA or from HPA to floating-point depending on the type of special value represented.

In practice, analysis of typical high performance computing workloads has indicated that most sums can be accommodated with two or three HPA elements. While some HPA implementations may rely on the programmer to be knowledgeable about the anchor and the number of elements; this means the programmer must be aware of the range and number of values in the problem space. If the programmer gets this wrong, and in particular if a high-order HPA element overflowed, then there would be no recourse except to rerun the program with more elements and/or a different anchor.

The examples described below show HPA implementations that can make it much easier for the programmer. With these examples, HPA supporting hardware can in principle be used to accumulate over any range.

Hence, Mien processing a series of HPA operations, the following steps can be taken:
(1) retain the initial value of the vector elements (that is, save the initial vector registers we will be accumulating into—these are likely to contain zeros).
(2) Accumulate some number of FP values into the vector elements, setting a sticky overflow bit in the high-order element if an overflow occurs (see the saturated data type discussed above).
(3) Periodically check whether the overflow bit is set (the redundancy elimination step is a good place to do this, and also when the accumulation has completed). If no overflow, than retain the new value of the SVE elements and capture checkpointing information in the accumulation flow, and go to step (2). If overflow, then increase the number of elements and rerun from the last saved value and checkpoint information of the SVE elements.

Further enhancements to this idea may include:
(a) To use the high-order element indicating overflow to hold information about what caused the overflow, most usefully the exponent of the value causing the overflow. If that exponent is in the expected range, then rerunning the partial accumulation, as in step (2) above, with one additional element will likely eliminate the problem. If the exponent is out of range, then the partial accumulation may need additional elements. For example, suppose the expected range is $2^0$ to $2^{100}$, something we could accumulate using two elements. If instead we get a bit valued at $2^{180}$, then we are going to need two additional elements (in an example using 64-bit elements).
(b) To use a similar scheme on the low-order element of a sum to detect and react to underflow. Again, the offending exponent could be captured in the element, and the partial accumulation could be rerun using additional element(s) with lower anchors.
(c) Combining (a) and (b) to allow the automatic accumulation over any range.
(d) Making available to the programmer one or more indications: conditions necessitating rerun, the final number of elements in the accumulator, and the final anchor value. These data could be captured in general purpose registers or private registers and made available in accumulator elements after a reduction operation.

Using these enhancements would allow a general-purpose library routine to perform any floating-point accumulation, without any special input from the programmer. In most cases, the accumulation would still only require two or three elements, but unlikely inputs and ranges could also be accommodated in the same associative and reproducible framework.

Hence, these examples may provide:
(1) Dynamic handling of overflow in an HPA accumulation
(2) Dynamic handling of underflow in an HPA accumulation
(3) Making available status of the use of the HPA accumulator Some more specific examples of these techniques are described below.

Figure 12:
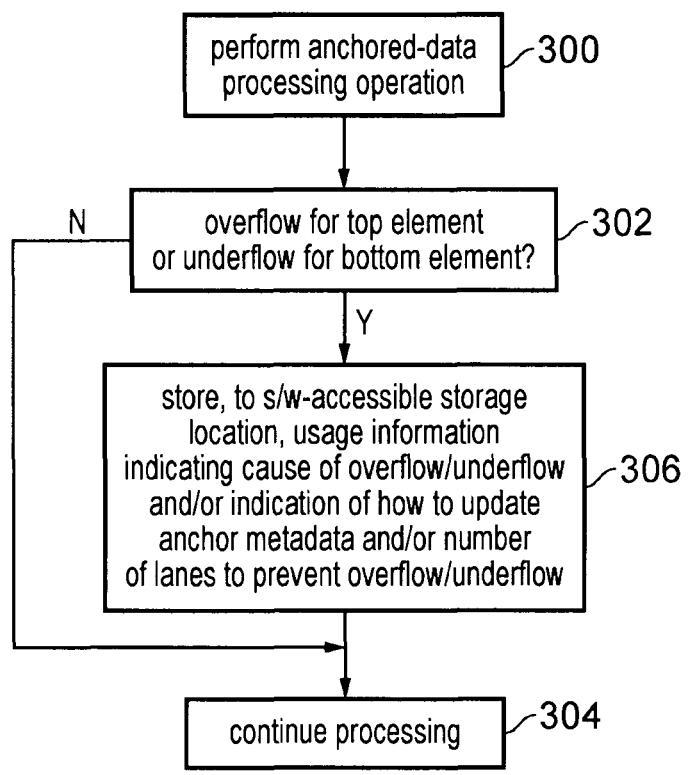
FIG. 12 illustrates a method for anchored-data processing including storing usage information in response to an overflow or an underflow.

FIG. 12 is a flow diagram showing a method of generating usage information for anchored-data processing operations which involve overflow or underflow. Although FIG. 12 shows generating this information for both overflow and underflow, other examples could generate it on an overflow.

At step 300 the processing circuitry 14 performs an anchored-data processing operation in response to an instruction decoded by the instruction decoder 20. This operation could for example be a floating point conversion operation, or it could involve both a floating point conversion and a subsequent addition of the converted floating point value to an accumulator in anchored-data format. Also the anchored-data processing operation could be a HPA addition or other operation involving processing of HPA values. At step 302 the processing circuitry 14 detects whether there has been overflow for an operation which generated the top (most significant) element of a given HPA value, or whether there has been an underflow for a bottom (least significant) element of the HPA value (in implementations which support the underflow detection). Whether the operation generates the top or bottom element may be indicated by the lane type information 196 in the anchor metadata. If there has been no overflow of a top element or underflow of the bottom element, then at step 304 processing continues. In some cases, if there is a lane overflow from an intermediate or bottom element of the HPA value then an exception may be signalled.

On the other hand, if an overflow of the top element or an underflow of the bottom element is detected, then the hardware triggers storage of usage information to a software-accessible storage location. The software-accessible storage location could be a location within memory 4, or a second register within the register bank 12 separate from the register storing the result of the anchored-data processing operation. However, it can be most convenient and simple to implement in microarchitecture if the software-accessible storage location is the destination register of the anchored-data processing operation itself. For example, in cases when an overflow or underflow has been detected, the result data element could be generated with the special value encoding as shown in FIGS. 9 and 10, with the top bit set to 1. The usage information could be stored within some of the empty bits 0 to 60 as shown in FIG. 9, which are no longer needed because the value is special and so there is no two's complement values to be represented. This avoids the need for writing to two registers in response to one instruction. The writing of the usage information to the software accessible storage location does not require any dedicated instructions specifying the usage information or how it is to be stored, instead this may be hardwired into the micro-architecture such that the storage of the usage information is triggered automatically if an anchored-data processing operation generates an overflow or underflow.

The usage information indicates either a cause of the overflow or underflow (e.g. the exponent of a floating point value converted as part of the anchor-data processing operation, or other information derived from the exponent such as a margin by which the exponent outside the maximum or minimum exponent that could be completely represented within the allowable range of the HPA value), or indicates how to update the number of HPA elements in the HPA value and/or the anchor metadata to change the anchored-data format to prevent overflow or underflow. For example, the usage information could indicate how many extra HPA elements are needed to fully represent the required numeric values, or what value the lane significance should be set to, to avoid overflow/underflow. Some examples could provide multiple types of usage information. Having stored the usage information then processing may then continue at step 304.

In further operations performed after an anchored-data processing operation which generated usage information, further result-data-elements may also specify the usage information, so that the usage information is preserved through a series of operations regardless of whether the inputs to those later operations were themselves a cause of overflow. However, if having stored usage information for one operation based on an exponent of a floating point value which lies outside the accepted range, a subsequent operation then encounters an even larger exponent value, then this could be updated in the usage information of subsequent results.

The storage of this usage information can be very useful for assisting with software routines which support dynamic adjustment of the number of lanes (HPA elements) in the HPA value and/or dynamic adjustment of the anchor information automatically as part of the code, which can alleviate the burden of the programmer in knowing what anchor information to set. FIG. 13 is a flow diagram showing how such software could function. Alternatively, in some implementations the processing circuitry itself may perform the functions shown in FIG. 13, to react automatically to detected overflows or underflows to change the format of the HPA value.

At step 400, prior to performing the first portion of a sequence of data processing operations to be performed, a checkpoint of architectural state is captured. For example, this may be triggered by a series of store instructions which store the values of certain registers to locations in memory 4.

At step 402 the software then proceeds to perform the next portion of the sequence of data processing operations involving at least one anchored-data processing operation. For example, this may include a set of instructions for taking a number of floating point inputs, converting them into anchored data values and then performing additions on those anchored data values. The conversions and the additions could be performed by separate instructions or could be combined into combined convert and add instructions. The portion of the sequence could be of a given length, for example it could correspond to a number of additions which can safely be performed without overlap reduction as discussed above.

At step 404 the program code includes an instruction for checking whether any overflow or underflow occurs during the previously performed portion of the sequence of data processing operations. For example this instruction could check whether the result represents a special value, and if so check the special value encoding and/or the usage information generated by the hardware as shown in FIG. 12, to determine whether an overflow/underflow occurred. If no overflow or underflow is detected, then the portion of operations were performed correctly and there is no need to update the number of lanes or the anchor information, and so at step 406 it is determined whether processing has reached the end of the sequence of data processing operations to be performed using anchored-data processing. If not, then the method returns to step 400 to take another checkpoint of architectural state based on the values resulting from the previously performed portion of the sequence, and then the method loops through steps 400-404 again.

If an overflow or underflow was detected at step 404 then the method proceeds to step 407, where it is determined whether at least one retry condition is satisfied by the usage information generated by the hardware when the overflow/underflow occurred. For example, the at least one retry condition could include any one or more of:

a condition satisfied when a margin of overflow or underflow is less than a predetermined amount. The margin of overflow may be the difference in significance between a most significant bit of an input value to be processed or a value generated in the HPA processing, and a most significant bit representable using the HPA format given the current anchor information and current number of elements in the HPA value. The margin of underflow may be the difference in significance between a least significant bit of an input value to be processed or a value generated in the HPA processing, and a least significant bit representable using the HPA format given the current anchor information and current number of elements in the HPA value.

a number of additional anchored-data elements required to prevent the overflow or underflow being less than or equal to a predetermined number; and a number of previous attempts to retry said portion of the sequence of data processing operations being less than a predetermined threshold.

By checking whether one or more of these conditions are satisfied, to determine whether it is worth retrying the previous portion of the code sequence based on an updated number of elements and/or updated anchor information, this can be useful for restricting the dynamic update to cases where a relatively small adjustment of the number of elements or anchor information is enough to deal with the overflow/underflow. When the margin of overflow/underflow is greater, it may not be efficient to extend the HPA value by a very large number of elements and it may be that it is more efficient to simply record the fact that overflow/underflow occurred, and terminate processing or continue without retrying. Also, if there have already been a given number of retries and this has been unsuccessful in dealing with the overflow/underflow, it may be preferred to avoid performing another retry.

Hence, when the at least one retry condition is satisfied by the usage information, then at step 408, the number of lanes (HPA elements) and/or the anchor information is updated for at least one anchored-data value processed in the previous portion of the sequence. In some implementations this update may be based on the usage information discussed in FIG. 12 above, which was set by the hardware in response to the operation which caused the overflow or underflow. However other examples could simply update the number of lanes or the anchor information in some default manner, such as changing the significance of the anchored data value by a certain amount, or extending the number of elements provided in the HPA value by a given increment (e.g. one additional element). At step 410 the most recently captured checkpoint of architectural state is restored to registers 12, for example by the software including load instructions for loading values into the relevant registers from the memory locations at which the checkpoint was previously saved. At step 412 this software triggers a retry of the previously performed portion of the sequence of data processing operations, based on the updated number of lanes and/or anchor information and the restored checkpoint of architectural state. For example the code may include a branch which branches back to the start of the previously performed portion of the sequence. Once that portion is completed again, the method then returns to step 404 to detect again whether there has been an overflow or underflow as discussed above. Hence, in some cases if the initial update to the anchor information was successful then only a single retry would be needed, but sometimes overflows or underflows could occur multiple times if the initial update was not enough, and then in this case there would be several loops through steps 404-412. Eventually, the current portion of the sequence is completed without overflow or underflow, and the method then proceeds to step 406 as discussed above and can proceed to the next portion of the sequence.

On the other hand, if at step 407 the at least one retry condition was not satisfied by the usage information, then at step 414 the sequence is terminated, or alternatively the sequence is continued without retrying the previously performed portion of the sequence. In the case of termination, an exception could be signalled, for example. If the sequence is continued, although the previous overflow/underflow means that the result of the rest of the sequence may not be correct, it could still be considered worthwhile to continue the processing, as a further overflow/underflow may occur in a later part of the sequence that might have an even larger margin of overflow/underflow, so in cases where no retry is being performed, it may be preferred to allow the sequence to complete so that a fuller picture of the modifications to the HPA format required to avoid overflow/underflow can be gathered.

If processing of the sequence is terminated or continued without retry at step 414, then at step 416 information may be returned on any overflows or underflows which occurred. For example, this information could identify the exponent of a floating-point value that caused the overflow/underflow, and/or could specify how many overflows/underflows occurred, and/or could specify the point in the sequence at which the overflow/underflow occurred, or could provide any other information useful in analysing why the overflow/underflow occurred.

In some examples, step 407 may not be included, and in this case the dynamic update to the anchor information and/or number of lanes and automatic retry may be performed according to steps 408-412, regardless of whether the usage information satisfies the retry condition.

At some point, if any overflows/underflows have been able to be addressed by the dynamic retries, then at step 406 the end of the sequence data processing operations is reached, having completed each portion without overflow or underflow being detected as occurring, either because they were successful first time, or because after one or more retries the overflow or underflow no longer occurred. Once the end of the sequence has been reached, then at step 418 the software code may include instructions for triggering storage of information on the final anchor metadata which resulted from the sequence, a final number of elements associated with a given HPA value processed in the sequence, or information on conditions which may have required a given portion of the sequence to be retried. In general, some information may be stored here which enables a software to check why overflows or underflows may have happened or to enable them to identify what the most appropriate setting of the anchor metadata would have been, and then this can be used to improve subsequent attempts to execute the same program, as the anchor metadata and number of lanes could then be set to that preferred value from the start so that the performance can be improved the next time the program is executed by avoiding needing as many retries.

Figure 13:
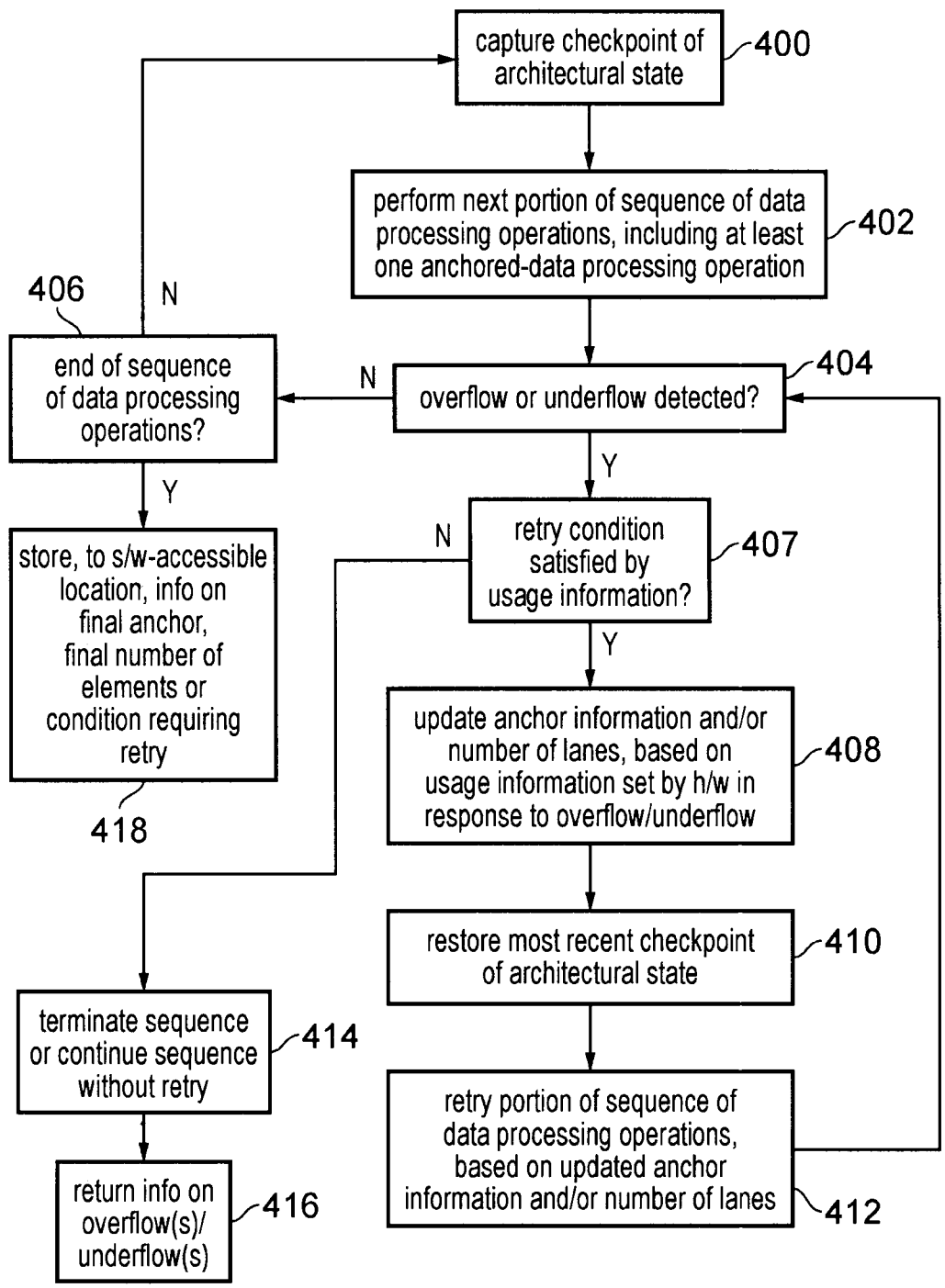
FIG. 13 illustrates a method for dynamic adjustment of anchor information and/or a number of elements included in the anchored-data value, during a sequence of data processing operation including at least one anchored-data processing operation.

Although FIG. 13 shows the storage of information on the condition requiring the retry at step 418, it would also be possible to store this information at the time of updating the anchor information at step 408, to avoid needing to retain information on the cause of the overflow or underflow for as long.

Figure 14:
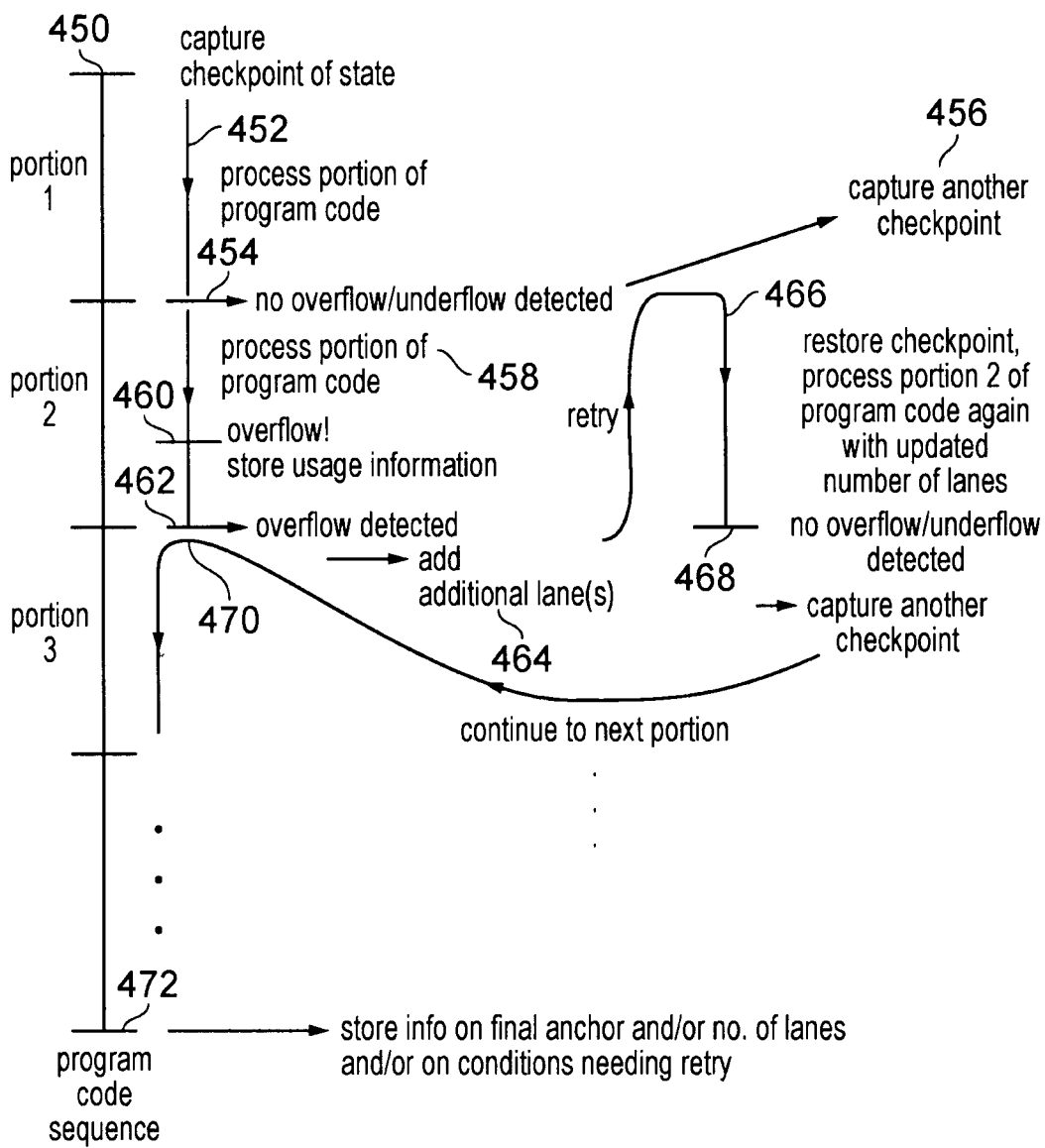
FIG. 14 illustrates an example of processing a code sequence using the method of FIG. 13.

FIG. 14 schematically illustrates an example of processing a sequence of program code (which includes HPA processing operations), according to the method shown in FIG. 13. An initial checkpoint of register state is captured at point 450 shown in FIG. 14. The checkpoint covers any state which could be overwritten as a result of processing the next portion of program code. The checkpoint is captured by saving the captured state to memory, or by updating architectural-to-physical register mappings so that subsequent updates of register state are made in a different physical register to the registers storing the previous checkpoint of register state.

At point 452, portion 1 of the program code sequence is executed. On completion of portion 1, overflow/underflow detection is performed at point 454, and in this example, it is detected that no overflow or underflow occurred. Therefore, another checkpoint of register state is captured at point 456, and then portion 2 of the program code sequence is executed at point 458.

At point 460 during processing of portion 2, an overflow occurs. The processing hardware automatically stores usage information to a software-accessible storage location, indicating information on a cause of the overflow and/or how to adapt the number of HPA elements to address the overflow. Execution of portion 2 of the sequence continues, and at the end of the portion, at point 462 again overflow/underflow detection is performed, and this time the overflow/underflow detection determines based on the usage information that an overflow did occur.

In this example, it is assumed that if any retry conditions are imposed, then those retry conditions were satisfied by the overflow. If any required retry condition was not satisfied, then the code sequence could be terminated or allowed to continue without retry. However, in this particular example, the retry condition is satisfied, and so at point 464 the program code extends the number of HPA elements in the HPA format by at least one additional element, in an effort to avoid the overflow. For an overflow, the lane significance indicated by the anchor information for existing lanes of the HPA format remains the same, so that the least significant element still has the same significance as before. However, an update to the lane type for the previous most significant lane is made to change that lane to an intermediate lane, as there is now an additional more significant lane. At point 466 the program code restores the checkpoint of state previously captured at step 456, branches back to the start of portion 2 of the code sequence, and retries execution of portion 2, based on the updated number of HPA elements. This time, no overflow or underflow occurs during the second attempt to process portion 2, so at point 468 no overflow/underflow is detected, and another checkpoint of register state is captured, and then at point 470 processing continues with portion 3 of the code sequence.

Each portion is then processed in a similar way, until eventually the end of the code sequence is reached at point 472, when information on the final number of lanes or anchor metadata, and/or on conditions needing retry, is returned.

FIG. 15 shows an example of providing at least one additional HPA element in response to a detected overflow. As shown at the top of FIG. 15, a reason for the overflow may be that a floating point value 1·F input as an input operand to the HPA processing sequence has a value which is greater than is representable by the current HPA format as defined by the current number of HPA elements (2 in this example) and the anchor metadata (anchor[0], anchor[1]). In embodiments where the overlap bits of the most significant element of the HPA value are considered part of the range of significance represented by the HPA value, the overflow margin may be as shown in the solid line 480 shown in FIG. 15, while in embodiments where the overlap bits of the most significant element of the HPA values are not considered part of the range of significance represented by the HPA value, the margin of overflow is as shown in the dotted line 482.

Hence, when an overflow occurs, the hardware may record, as usage information, information for assessing the margin of overflow. For example, the usage information could indicate the exponent E of the floating-point value, or the margin of overflow, or an indication of the number of additional elements needed to handle the overflow. Where the margin of overflow is Z, the number of additional elements required to avoid overflow J may be the value of J that satisfies the condition $(J-1)*(N-V)<Z\leq J*(N-V)$, where N is the number of bits per HPA element and V is the number of overlap bits. For example, if the overflow margin Z is less than or equal to N-V, one additional HPA element at the most significant end may be enough, while if the overflow margin Z is greater than N-V, more than one additional element may be required.

In the example of FIG. 15, the overflow can be handled with the provision of one additional HPA element as shown at the bottom of FIG. 15. When retrying the previous portion of the code sequence based on the updated number of lanes and the restored checkpoint of register state, the additional lane at the upper end is initially populated with sign bits (which match the sign of the most significant bit of the corresponding HPA value in the restored register state). In the case shown in FIG. 15 where only an overflow has occurred, the lane significance 192 (which is shown in FIG. 7) indicated by the anchor metadata for the lower lanes can remain the same, but the lane type 196 of HPA element HPA[1] is updated from indicating the most significant lane (M) to indicating the intermediate lane (I) The anchor metadata for the newly added element HPA[2] indicates the most significant (M) lane type and specifies as the lane significance 192 a value obtained by adding N-V to the lane significance 192 in the anchor metadata anchor[1] associated with HPA[1]. The previously performed portion of the code sequence can now be retried and this time when the floating-point operand which caused the overflow is encountered, its numeric value can be accommodated within the range representable by the HPA format.

FIG. 16 shows another example where an underflow is addressed by providing at least one additional HPA element at the lower end of the HPA value. Unlike for overflow, for underflow the significance indicated by the anchor metadata for the existing lanes of the HPA value should be adjusted. In this example, the margin of underflow UM is such that two additional lanes are needed. Additional elements HPA[0]' and HPA[1]' are added, defined as least significant (L) and intermediate (I) lane types in the lane type field 196 of the corresponding anchor metadata. The additional elements HPA[0]' and HPA[1]' are initially populated with zeroes when restarting the previous portion of the code sequence which caused the underflow. The values in the restored checkpoint of register state corresponding to the HPA elements previously indicated as HPA[0] and HPA[1] at the top of FIG. 16 are now treated as HPA elements HPA[2]' and HPA[3]' of the updated HPA format. Hence, the lane significance 192 of HPA[2]' and HPA[3]' in the updated HPA format matches the lane significance 192 specified in the anchor metadata for lanes HPA[0] and HPA[1] prior to the update. The lane types 196 for elements HPA[2]' and HPA [3'] are Intermediate and Most significant element respectively. The newly added element HPA[1]' has its lane significance set to anchor[0]-(N-V) (where anchor[0] is the lane significance of HPA[0] prior to the dynamic update), and newly added element HPA[0]' has its lane significance set to anchor[0]-2*(N-V). The previous portion of code can then be retried with the updated number of elements and anchor information.

While FIGS. 15 and 16 show examples where only one of overflow and underflow occurs, it is possible for both overflow and underflow to occur within the same portion of the code sequence, in which case the extension of the number of elements can include adding more elements at both ends of the HPA value.

It will be appreciated that in the embodiments where an HPA value is striped across multiple registers as shown in FIG. 5A, when the number of HPA elements is extended as shown in FIGS. 15 and 16, then a greater number of instructions will need to be executed in the retried portion of the code sequence compared to the first attempt to execute that portion, as each HPA element of the overall HPA value is processed by a respective instruction writing to a different destination register. This can be achieved by defining a variable which defines the total number of elements in the HPA value, and executing a program code loop (or alternative program flow controlling structure, such as using conditional branches) with a number of iterations of instruction execution corresponding to the total number of elements in the HPA value.

Figure 17:
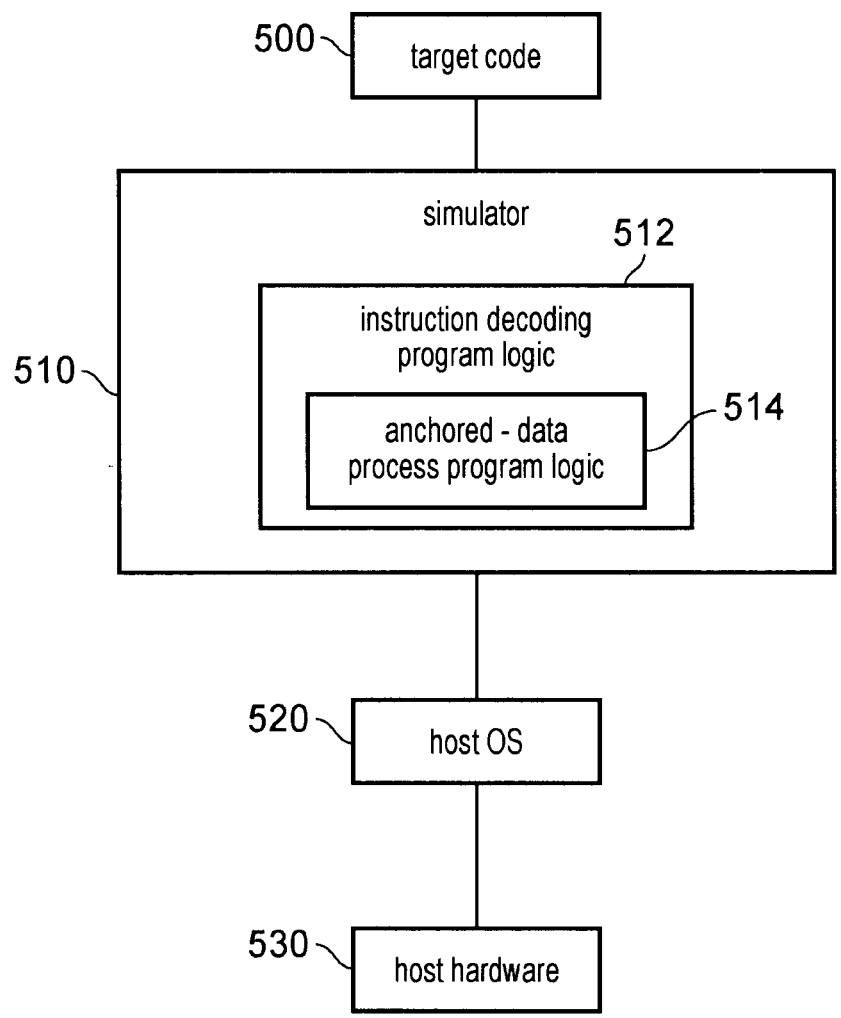
FIG. 17 shows a simulator example that may be used.

FIG. 17 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 530, optionally running a host operating system 520, supporting the simulator program 510. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 530), some simulated embodiments may make use of the host hardware, where suitable.

The simulator program 510 may be stored on a computer-readable storage medium (which may be a non-transitory medium), and provides a program interface (instruction execution environment) to the target code 500 (which may include applications, operating systems and a hypervisor) which is the same as the application program interface of the hardware architecture being modelled by the simulator program 510. Thus, the program instructions of the target code 500, including instructions supporting processing of HPA values as described above, may be executed from within the instruction execution environment using the simulator program 510, so that a host computer 530 which does not actually have the hardware features of the apparatus 2 discussed above can emulate these features. The simulator program 510 may include instruction decoding program logic 412 for decoding the instructions of the target code 500 and mapping them to native instructions supported by the host hardware 530. The instruction decoding program logic 512 includes anchored-data processing program logic 514 which maps HPA processing instructions to sets of native instructions for performing HPA (anchored-data processing) operations such as FP conversions, additions or overlap propagation operations as discussed above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
processing circuitry to perform data processing; and
an instruction decoder to control the processing circuitry to perform an anchored-data processing operation to generate a result anchored-data element of an anchored-data value comprising one or more anchored-data elements each representing a respective portion of bits of a two's complement number, said anchored-data value associated with anchor information indicative of at least one property indicative of a numeric range representable by the result anchored-data element or the anchored-data value; in which:
in response to an anchored-data processing operation for which the anchor information indicates that the anchored-data processing operation would cause an overflow or underflow of the two's complement number to be represented by the anchored-data value, the instruction decoder is configured to control the processing circuitry to store usage information to a software-accessible storage location;
in which the anchored-data processing operation is dependent on a conversion of a floating-point value to an anchored-data element representing a portion of bits of the two's complement number corresponding to the floating-point value; and
the usage information stored in response to identifying the overflow or underflow comprises one or more of:
the exponent of the floating-point value;
when the anchored-data processing operation also includes addition of an anchored-data element obtained by converting the floating-point value to another anchored-data element, whether the overflow was caused by the floating-point value being outside said numeric range or by the addition when the floating-point value was within said numeric range;
an indication of how far the exponent of the floating-point value is outside said numeric range; and/or
an indication of a number of additional elements needed in the anchored-data value to accommodate a numeric value equivalent to the floating-point value.

2. The apparatus according to claim 1, in which the processing circuitry is configured to specify the usage information within part of the result anchored-data element generated in the anchored-data processing operation causing the overflow or the underflow.

3. The apparatus according to claim 1, in which, in response to an anchored-data processing operation for which an input anchored-data element specifies the usage information, the processing circuitry is configured to generate a result anchored-data element also specifying the usage information.

4. The apparatus according to claim 1, in which the anchor information comprises element type information indicative of whether the result anchored-data element is a most significant, intermediate or least significant anchored-data element of the anchored-data value.

5. The apparatus according to claim 4, in which the instruction decoder is configured to control the processing circuitry to store the usage information to the software-accessible storage location in response to at least one of:
an anchored-data processing operation for which the anchor information indicates that the result anchored-data element is the most significant anchored-data element of the anchored-data value, and which causes an overflow of the result anchored-data element; and
an anchored-data processing operation for which the anchor information indicates that the result anchored-data element is the least significant anchored-data element of the anchored-data value, and which causes an underflow of the result anchored-data element.

6. The apparatus according to claim 1, in which the processing circuitry is operable to perform at least one of:
when the overflow is detected within a portion of a sequence of processing operations including the anchored-data processing operation, extending the anchored-data value by at least one additional anchored-data element at a most significant end of the anchored-data value;
when the underflow is detected within said portion of a sequence of processing operations, extending the anchored-data value by at least one additional anchored-data element at a least significant end of the anchored-data value; and
when both the overflow and the underflow are detected within said portion of a sequence of processing operations, extending the anchored-data value by at least one additional anchored-data element at a most significant end of the anchored-data value and by at least one additional anchored-data element at a least significant end of the anchored-data value.

7. A data processing method comprising:
decoding one or more instructions; and
in response to the decoded instructions, controlling processing circuitry to perform an anchored-data processing operation to generate a result anchored-data element of an anchored-data value comprising one or more anchored-data elements each representing a respective portion of bits of a two's complement number, said anchored-data value associated with anchor information indicative of at least one property indicative of a numeric range representable by the result anchored-data element or the anchored-data value; in which:
in response to an anchored-data processing operation for which the anchor information indicates that the anchored-data processing operation would cause an overflow or underflow of the two's complement number to be represented by the anchored-data value, the processing circuitry stores usage information to a software-accessible storage location;
in which the anchored-data processing operation is dependent on a conversion of a floating-point value to an anchored-data element representing a portion of bits of the two's complement number corresponding to the floating-point value; and
the usage information stored in response to identifying the overflow or underflow comprises one or more of:
the exponent of the floating-point value;
when the anchored-data processing operation also includes addition of an anchored-data element obtained by converting the floating-point value to another anchored-data element, whether the overflow was caused by the floating-point value being outside said numeric range or by the addition when the floating-point value was within said numeric range;
an indication of how far the exponent of the floating-point value is outside said numeric range; and/or
an indication of a number of additional elements needed in the anchored-data value to accommodate a numeric value equivalent to the floating-point value.

8. A non-transitory storage medium storing a computer program for controlling a host data processing apparatus to provide an instruction execution environment for execution of instructions; the computer program comprising:
instruction decoding program logic to decode program instructions of target code to control the host data processing apparatus to perform data processing;
said instruction decoding program logic including anchored-data processing program logic to control the host data processing apparatus to perform an anchored-data processing operation to generate a result anchored-data element of an anchored-data value comprising one or more anchored-data elements each representing a respective portion of bits of a two's complement number, said anchored-data value associated with anchor information indicative of at least one property indicative of a numeric range representable by the result anchored-data element or the anchored-data value; in which:
in response to an anchored-data processing operation for which the anchor information indicates that the anchored-data processing operation would cause an overflow or underflow of the two's complement number to be represented by the anchored-data value, the instruction decoding program logic is configured to control the host computer to store usage information to a software-accessible storage location;
in which the anchored-data processing operation is dependent on a conversion of a floating-point value to an anchored-data element representing a portion of bits of the two's complement number corresponding to the floating-point value; and
the usage information stored in response to identifying the overflow or underflow comprises one or more of:
the exponent of the floating-point value;
when the anchored-data processing operation also includes addition of an anchored-data element obtained by converting the floating-point value to another anchored-data element, whether the overflow was caused by the floating-point value being outside said numeric range or by the addition when the floating-point value was within said numeric range;
an indication of how far the exponent of the floating-point value is outside said numeric range; and/or
an indication of a number of additional elements needed in the anchored-data value to accommodate a numeric value equivalent to the floating-point value.

9. A data processing method comprising:
capturing a checkpoint of architectural state;
performing a portion of a sequence of data processing operations based on the architectural state captured in the checkpoint, the portion including at least one anchored-data processing operation to generate a result anchored-data element of an anchored-data value comprising one or more anchored-data elements each representing a respective portion of bits of a two's complement number, said anchored-data value associated with anchor information indicative of at least one property indicative of a numeric range representable by the result anchored-data element or the anchored-data value;
performing overflow or underflow detection to detect whether the at least one anchored-data processing operation causes an overflow or underflow of the anchored-data value; and
when the overflow or underflow is detected:
restoring the checkpoint of architectural state,
changing a format of the anchored-data value; and retrying said portion of the sequence of data processing operations based on the changed format and the restored checkpoint of architectural state.

10. The method of claim 9, in which in the absence of the at least one anchored-data processing operation causing an overflow or underflow, the method comprises capturing a further checkpoint of architectural state resulting from the portion of data processing operations, before performing a next portion of the sequence of data processing operations.

11. The method of claim 9, in which when the overflow is detected, said changing the format comprises extending the anchored-data value by at least one additional anchored-data element at a most significant end of the anchored-data value.

12. The method of claim 9, in which when the underflow is detected, said changing the format comprises extending the anchored-data value by at least one additional anchored-data element at a least significant end of the anchored-data value.

13. The method of claim 9, in which when both overflow and underflow are detected within said portion of sequence of data processing operations, said changing the format comprises extending the anchored-data value by at least one additional anchored-data element at a most significant end of the anchored-data value and by at least one additional anchored-data element at a least significant end of the anchored-data value.

14. The method of claim 9, in which the anchored-data element is an N-bit value including V overlap bits and W non-overlap bits;
in response to a float-to-anchored conversion operation for converting a floating-point value to an anchored-data element, when the number represented by the floating-point value is within an allowed numeric range, the W non-overlap bits of the anchored-data element are set to represent a portion of bits of the two's complement number corresponding to the floating-point value, and the V overlap bits of the anchored-data element are set to a sign-extension of the W non-overlap bits; and
the overflow or underflow detection is performed at a time of performing an overlap propagation operation to propagate carries represented by the V overlap bits of a first anchored-data element into the W non-overlap bits of a second anchored-data element.

15. The method of claim 9, comprising:
in response to an anchored-data processing operation for which the anchor information indicates that the anchored-data processing operation would cause an overflow or underflow of the two's complement number to be represented by the anchored-data value, storing usage information to a software-accessible storage location;
the usage information indicative of at least one of:
a cause of the overflow or underflow, and
an indication of how to change the format of the anchored-data value to prevent the overflow or underflow; and
said changing the format of the anchored-data value is dependent on the usage information.

16. The method of claim 15, in which when the overflow or underflow is detected, the method comprises:
determining whether the usage information satisfies at least one retry condition;
when the usage information satisfies said at least one retry condition, changing the format of the anchored-data value based on the usage information and retrying said portion of the sequence of data processing operations based on the changed format; and
when the usage information fails to satisfy said at least one retry condition, terminating the sequence of data processing operations or continuing the sequence of data processing operations without retrying said at least one portion.

17. The method of claim 16, in which when the usage information fails to satisfy said at least one retry condition, the method comprises returning the usage information or other information concerning the overflow or underflow.

18. The method of claim 9, comprising, on completion or termination of the sequence of data processing operations, storing to a software-accessible storage location, information indicative of at least one of:
a condition which required retry of a portion of the sequence of data processing operations;
a final number of anchor-data elements included in the anchored-data value when the sequence of data processing operations is completed; and
final anchor information resulting from any updates made during performance of the sequence of data processing operations.

19. A non-transitory storage medium storing a computer program for controlling a data processing apparatus to perform the method of claim 9.

* * * * *